United States Patent [19]

Watrous et al.

[11] 4,197,581

[45] Apr. 8, 1980

[54] CONTROL SYSTEM FOR AND METHOD OF CONTROLLING A COOKING APPLIANCE

[75] Inventors: Donald L. Watrous; Robert J. Simcoe, both of Liverpool, N.Y.

[73] Assignee: General Electric Company, Carmel, Ind.

[21] Appl. No.: 895,819

[22] Filed: Apr. 12, 1978

[51] Int. Cl.² .......................... G06F 15/46; H05B 1/02
[52] U.S. Cl. .................................... 364/400; 219/494;
219/497; 236/46 D; 364/104
[58] Field of Search ............... 364/400, 107, 104, 100;
219/492, 494, 497, 501, 489, 441, 442; 236/46
D, 46 R, 15 BG, 20 R; 99/325-328, 330-333,
336, 403

[56] References Cited

U.S. PATENT DOCUMENTS

| | | | |
|---|---|---|---|
| 3,326,692 | 6/1967 | Martino et al. | 99/325 |
| 3,821,516 | 6/1974 | Hayes et al. | 219/497 |
| 3,903,395 | 9/1975 | Hamstra | 219/501 X |
| 3,911,249 | 10/1975 | Keating | 219/441 |
| 3,979,056 | 9/1976 | Barnes | 219/489 X |
| 4,054,778 | 10/1977 | Wollich | 219/501 X |
| 4,058,703 | 11/1977 | Price | 219/494 X |

Primary Examiner—Joseph F. Ruggiero
Attorney, Agent, or Firm—Radford M. Reams, III; Arthur E. Bahr

[57] ABSTRACT

A cooking appliance, such as a deep fat fryer, includes programmable control system which monitors the operation of the cooking appliance and enables appropriate actions at proper times. The system includes a microcomputer which implements various timing and control functions. Control switches select operational states of the appliance. A diode matrix allows selection of input data. A multiplex circuit interconnects input signals to the microcomputer, a monitor circuit turns off the appliance if multiplexing stops. A temperature control circuit generates a signal responsive to the cooking fluid temperature and compares it with various reference signals under control of the microcomputer. A cooking control circuit generates a voltage proportional to the cooking fluid temperature, modifies it according to the desired doneness of the food being cooked, and converts it to a current which charges the capacitor in an oscillator. The oscillator provides a series of pulses which vary in frequency as the temperature of the fluid varies. These pulses are multiplexed to the microcomputer. Output circuits connect the microcomputer to various contactors controlling operation of the appliance and to indicators, such as lights and a buzzer. The control system provides a low energy melt state and a cooking state with energy input suitable for cooking food. It signals when a load of food is done. Additionally it enables signals when unwanted temperature conditions exist and turns off heat when temperature goes outside set limits.

38 Claims, 20 Drawing Figures

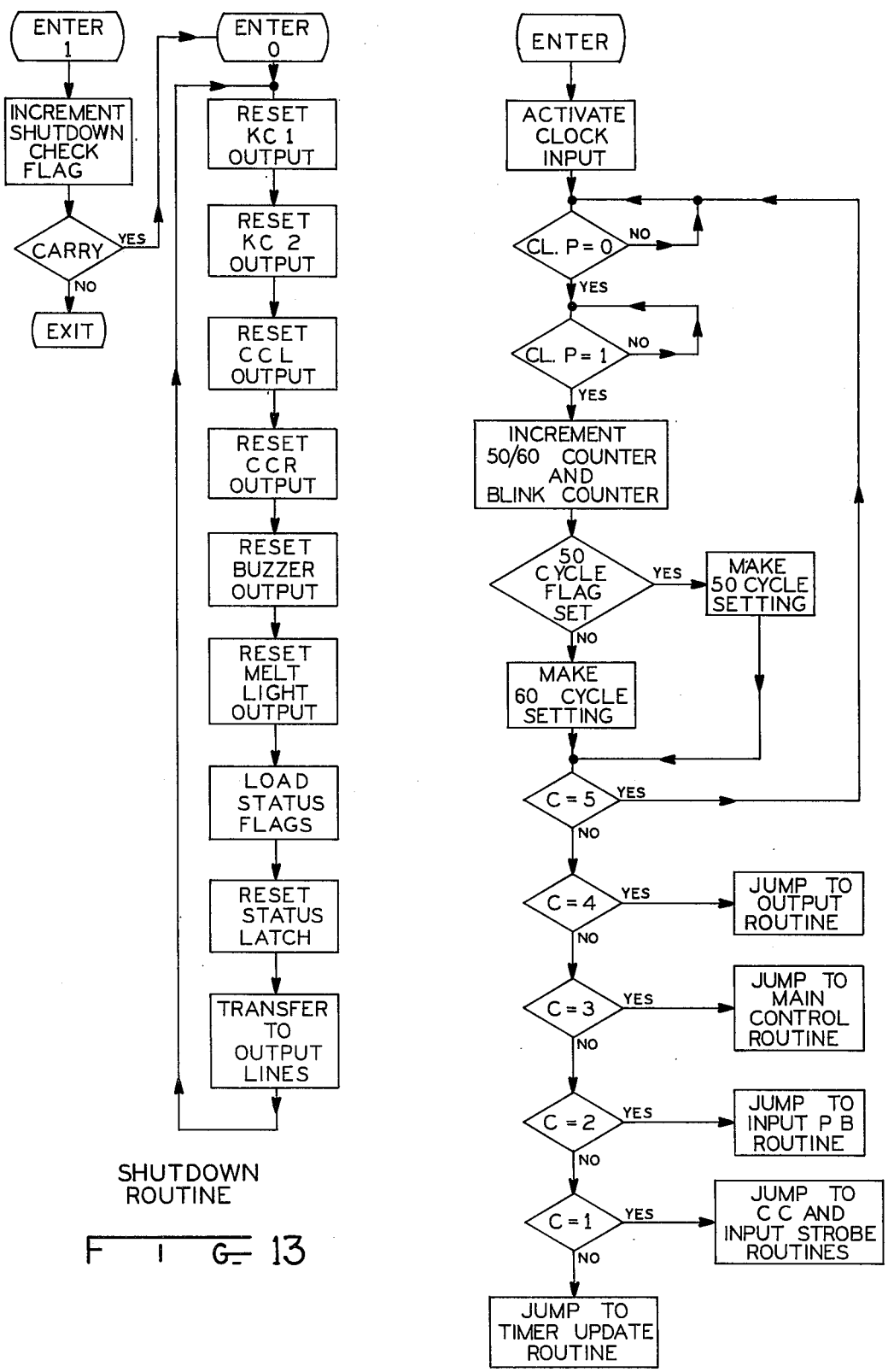

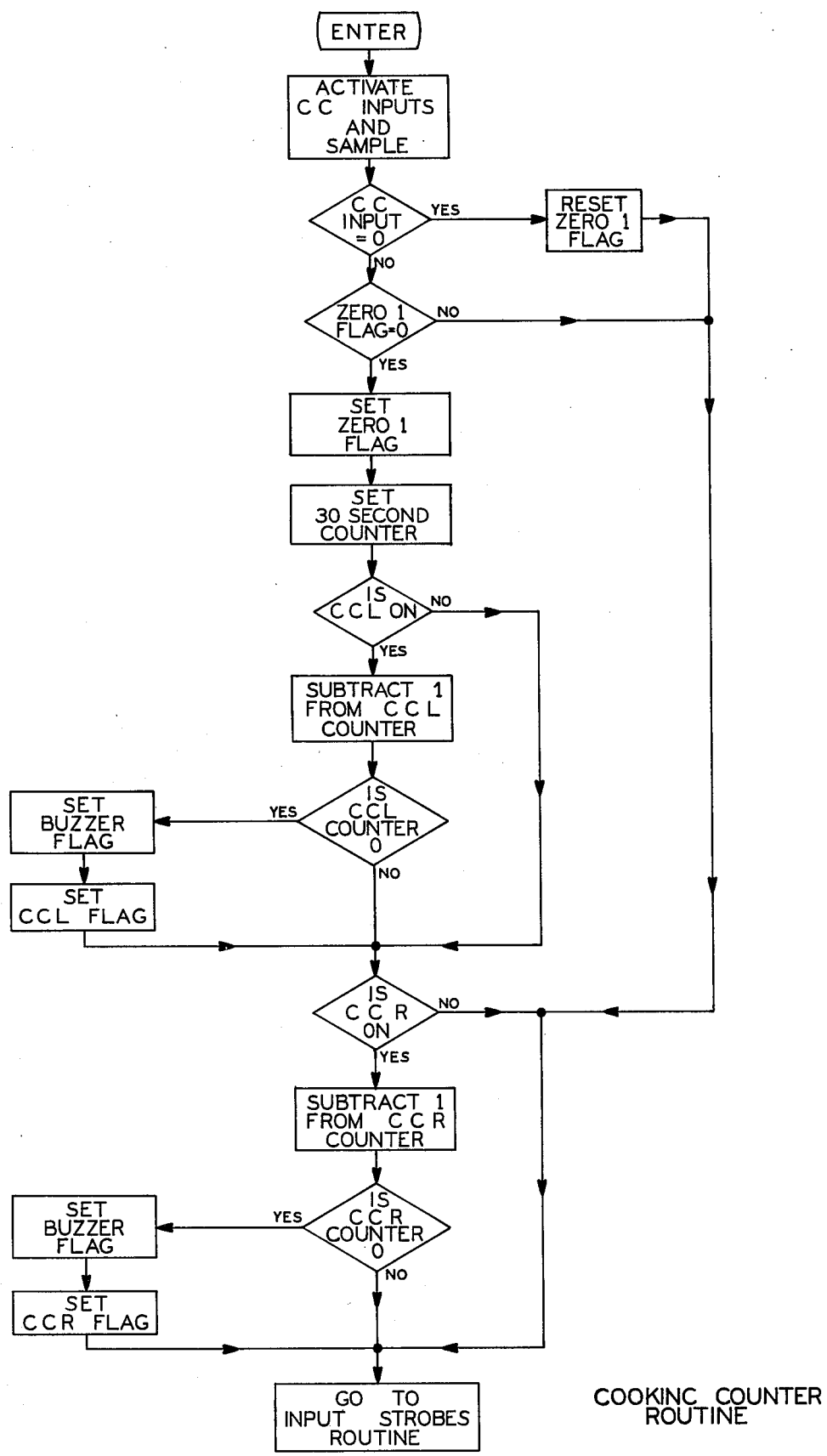
FIG. 15 COOKING COUNTER ROUTINE

INPUT PUSHBUTTON ROUTINE

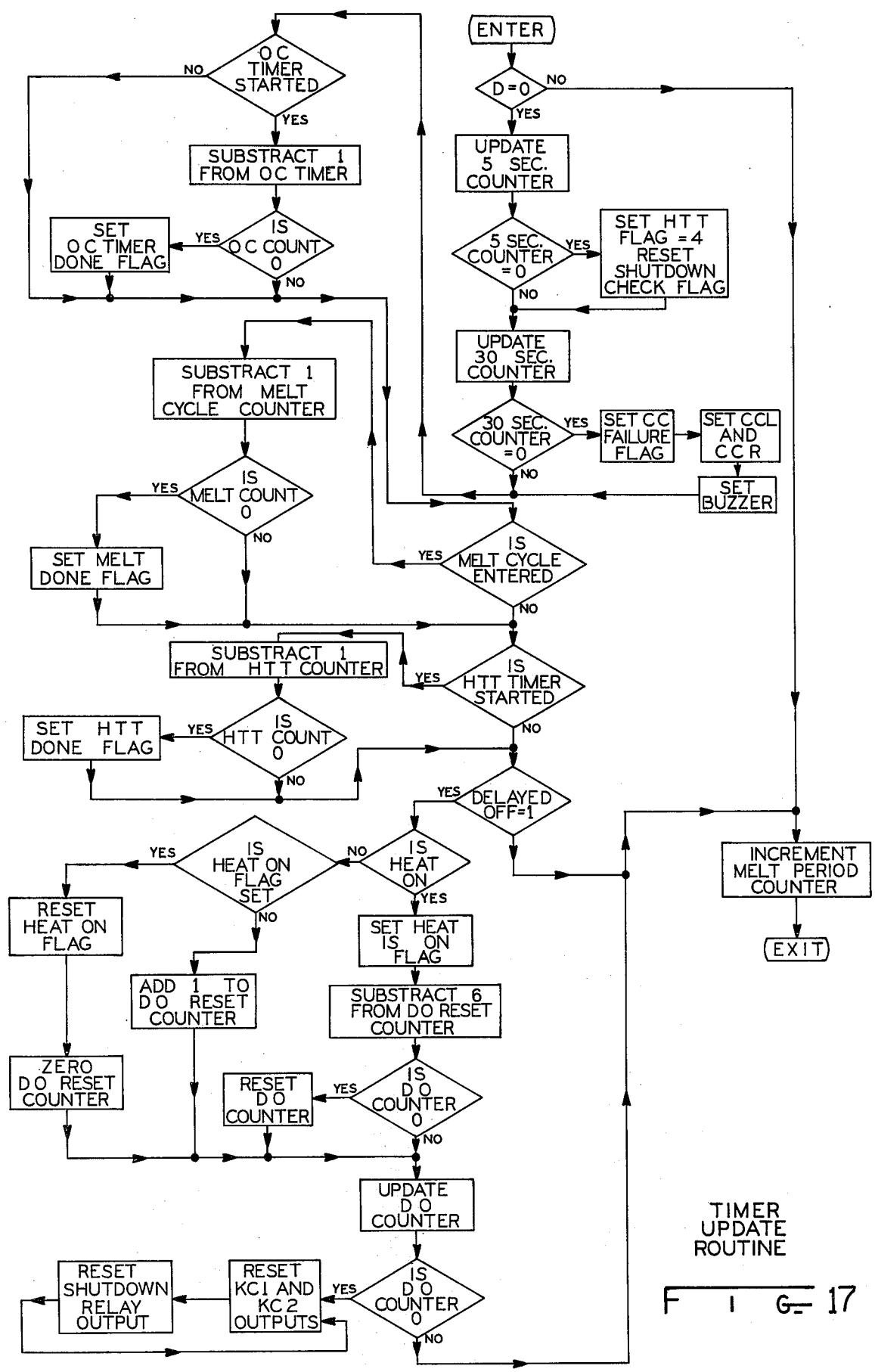
FIG. 17 — TIMER UPDATE ROUTINE

MAIN CONTROL ROUTINE

MAIN CONTROL ROUTINE

OUTPUT ROUTINE

CONTROL SYSTEM FOR AND METHOD OF CONTROLLING A COOKING APPLIANCE

BACKGROUND OF THE INVENTION

A typical conventional fryer control system consists of a mechanical control thermostat connected in series with two parallel connected contactor coils. Timing typically is provided by separate mechanical timers which merely alert the operator to the passage of time and are not integrated with the temperature sensing. Also prior solid fat melt control systems were essentially independent of the basic control. On the one hand this led to some of them being overly complicated in an effort to assure proper fat melt and, on the other hand, resulted in some being less than completely satisfactory. A number of approaches are known for attempting to correlate cooking time to the particular food being prepared and the actual cooking fluid temperature. Many prior art cooking controls have a narrow response range which limits any particular controller to use with a single food product. Other cooking controls attempt to provide a single cooking control for several foods by including a step type selector. With such an approach the control has only limited adjustment about each of a few benchmark control points. In some such controls the product or crisp selection varies the voltage operating limits of an integrating capacitor while cooking fluid temperature variations change the charging current. Such an approach provides a control which is not totally satisfactory. For instance, equal changes in voltage at different points in the operating range produce unequal differences in charging time.

It is thus desirable to provide an integrated system providing complete control, including improved interrelationship with the particular food being cooked and the cooking fluid temperature.

BRIEF SUMMARY OF THE INVENTION

It is therefore an object of the present invention to provide an appliance having an integrated control system, and method, for precise essentially continuous control of a cooking appliance, such as a deep fat fryer.

It is another object of this invention to provide an appliance including an improved control system, and method, which provides for repetitive measurement of the cooking fluid temperature and enables appliance operational states in accordance with the relationship of the measured temperatures to predetermined benchmark temperatures.

It is yet another object of this invention to provide an appliance including such an improved system, and method, which is effective to deenergize the appliance heating means in the event the cooking fluid temperature is outside prescribed limits at inappropriate times.

It is still another object of this invention to provide an appliance including such an improved system which automatically controls heat energy input for a selected cooking temperature and signals the occurrence of a low fluid temperature such as produced by a food overload condition.

It is a further object of this invention to provide a control system for timing the cooking of food including an oscillator to generate pulses and a counter to count the pulses, the end of the cooking cycle being determined by a predetermined pulse count. The control system generates a voltage representative of the cooking fluid temperature, modifies it according to the desired doneness of the food being cooked and converts it to a current. The current charges the integrating capacitor of the oscillator.

It is yet a further object to provide such a control system in which the integrating capacitor is charged between predetermined limits.

It is still another object to provide such a control system in which a signal representative of the cooking fluid temperature is continuously variable, within limits, to provide the desired degree of doneness for the particular food being cooked.

It is yet another object of this invention to provide an improved control system, and method, for a cooking appliance which is accurate, rapid, reliable and easily adjusted.

In accordance with a preferred embodiment of the present invention we provide a cooking appliance having at least one container for receiving a body of cooking fluid and food items to be cooked in the fluid, selectively energizeable heating means for heating the cooking fluid and a control system for controlling operation of the appliance. The control system includes means, including a thermistor adapted to be immersed in the cooking fluid, which continuously generates a signal representative of the then extant cooking fluid temperature. Reference means provides a plurality of reference signals, each of which is representative of a corresponding one of a high limit temperature of the fluid, a low limit temperature of the fluid, a set point temperature of the fluid for cooking food, and a fluid temperature indicative of a food overload. There is an operator activated switch for selecting one of a melt state of operation, in which the heating means is energized at a low heat energy level, and a cooking state, in which the heating means is energized at a high heat energy level suitable for cooking food. There is comparator means to compare the generated signal with each of the reference signals. There is computer means, including memory means for storing data defining a plurality of states of the cooking appliance. The data includes predetermined relationships between the generated signal and respective ones of the reference signals. The computer means repetitively strobes, or multiplexes, the comparator means to sequentially compare the generated signal with the reference signals, the computer receiving the comparison results. There is a timing means, effective on operator selection of the melt state, to provide a predetermined period of melt state operation.

At the conclusion of the timed melt operation the computer enables the cooking state of operation in response to the fluid temperature being above the low limit temperature and enables a shutdown state, in which the heating means is deenergized, in response to the fluid temperature being below the low limit temperature. During cooking state operation the computer enables heating means energization when the fluid temperature is below the set point temperature and enables heating means deenergization when the fluid temperature is above the set point temperature. The computer also enables a signal if the fluid temperature goes below the overload temperature. The computer also enables the shutdown state if the fluid temperature goes above the high limit temperature.

In accordance with another aspect of the invention the computer produces shutdown signals in response to comparisons indicating the fluid temperature is below the low limit temperature or is above the high limit temperature. The computer includes a counter which counts the shutdown signals and shutdown is enabled when a predetermined count is reached.

In accordance with still another aspect of the invention the system includes means for the operator to select a high temperature test of the mechanical overtemperature thermostat. When this test is selected, a computer timer provides a timed period of continuous heating means energization, even though the generated signal indicates the high limit temperature has been exceeded. At the end of the timed period the computer will enable the shutdown state in response to the generated signal indicating the high limit temperature has been exceeded.

In accordance with still another aspect of the invention there is a generation means, including a thermistor adapted to be immersed in the fluid, for generating a voltage representative of the fluid temperature. There also is a relaxation oscillator having an integrating capacitor. Conversion means modifies the generated voltage in accord with the desired doneness of the particular food being cooked and converts the modified voltage to a current. The current is used to charge the capacitor. Thus, the oscillator provides a series of pulses which vary in frequency as the temperature of the fluid varies. The computer includes means for counting the pulses and enables a signal and automatic basket lift mechanism upon a predetermined count being reached.

BRIEF DESCRIPTION OF THE DRAWING

FIG. 13 is a program flow chart illustrating a shutdown routine;

FIG. 14 is a program flow chart illustrating a routine for effectively differentiating between a 50 Hz and a 60 Hz input and distributing in time the computing functions;

FIG. 15 is a program flow chart illustrating a routine for counting pulses from the cooking control;

FIG. 17 is a program flow chart for a routine to update various timers in the computer;

FIG. 18 comprising

DETAILED DESCRIPTION OF THE PREFERRED EMBODIMENTS

Figure 1:
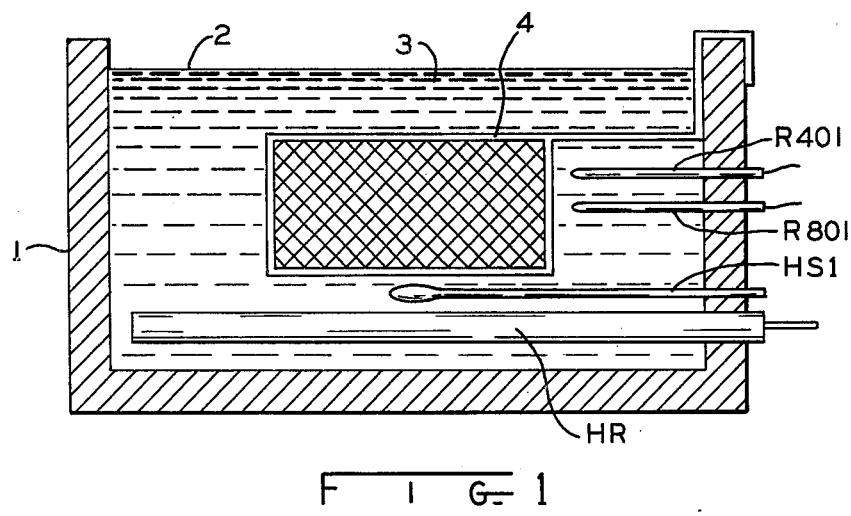
FIG. 1 is a schematic representation of certain basic components of a deep fat fryer suitable for use with the present invention.

FIG. 1 illustrates certain basic components of a deep fat fryer for use in the exemplification embodiment of the subject invention system. Typically a deep fat fryer includes a housing 1 defining a chamber 2 which receives a body of cooking fluid 3. Items of food to be cooked are placed in one or more baskets 4, which are suspended in the cooking fluids. The fluid is heated to a desired temperature in order to cook the food. The heat energy may be supplied by an electrically energized sheathed heater structure HR, which is directly immersed in the fluid. Alternatively, gas heating elements may be positioned below the container. The bulb of a mechanical thermostat HSI is positioned in the fluid and serves to interrupt the supply of heating energy if the fluid temperature rises to an excessively high level. Thermistor probes R401 and R801 also are positioned in the fluid and are connected in the temperature control (FIG. 7) and cooking control (FIG. 8) circuit portions of the overall circuit of the control system.

It is common practice to rotatably support the electric heater structure HR so that it can be tilted up out of the cooking fluid. This is an aid in cleaning the fryer, as well as filtering and changing the cooking fluid. Also it is common practice to suspend the mechanical thermostat, such as HSI, from the heater structure. Similarly thermistor probes R401 and R801 can be supported from the heater structure. The details of such mechanical mounting arrangements do not form part of this invention and they have been omitted for the sake of simplicity.

Figure 2:
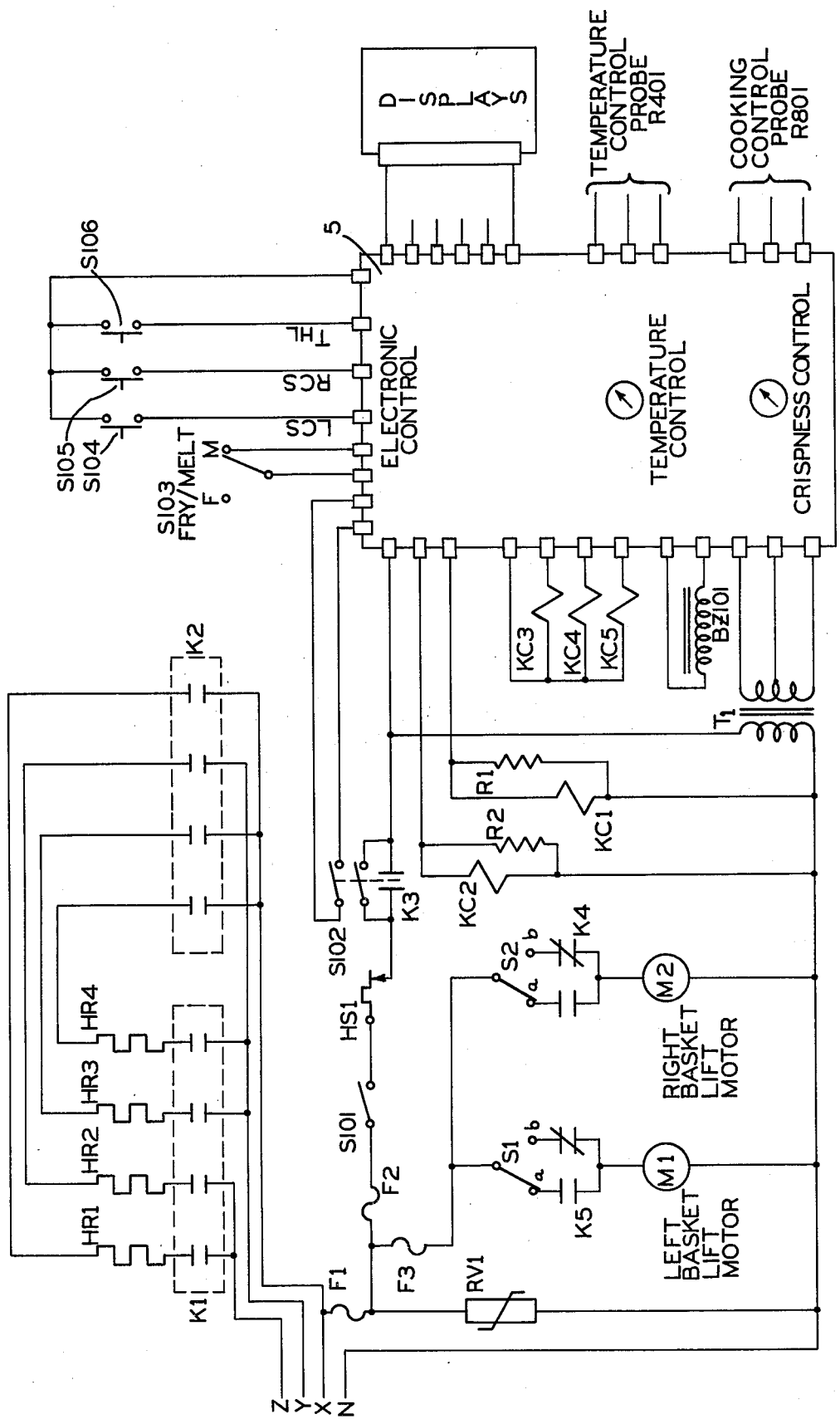
FIG. 2 is a schematic circuit diagram of a deep fat fryer control system incorporating one embodiment of the present invention.

FIG. 2 is a somewhat simplified schematic diagram of a typical electrical interconnection for a fryer, including a control system, of the present invention. Electric power is supplied through a 3 phase, 4 wire supply cable having power conductors X, Y and Z and neutral conductor N. Power to energize the electronic control 5 flows through the on-off switch S101, through the contacts of the overtemperature thermostat HSI, and the contacts of relay K3. To energize the electronic control, it is necessary to depress reset switch S102 which then applies voltage to transformer T1. The electronic control then energizes the coil KC3 of relay K3, sealing in the electronic circuit to the supply voltage. This enables the electronic control to disconnect itself from the power line by de-energizing relay coil KC3. Contactors K1 and K2 apply voltage to the heaters HR1, HR2, HR3 and HR4, comprising heater structure HR. The coils KC1 and KC2 for contactors K1 and K2 are energized through the electronic control.

Relays K4 and K5 operate the basket lift motors. The coils KC4 and KC5 for relays K4 and K5 also are energized by the electronic control. The basket lifts serve to automatically lower and raise baskets 4 of food. Consider for illustration purposes the left basket lift mechanism. As shown, the motor M1 is deenergized. When KC5 is energized, the contacts of relay K5 in series with switch terminal S1b open and the contacts in series with switch terminal S1a close. The motor then runs to lower the associated basket of food. When the lift mechanism reaches its lower travel limit, switch arm S1 is moved to contact S1b. This deenergizes the motor. When coil KC5 is deenergized the contacts of relay K5 again switch states to that illustrated. The motor M1 then raises the basket and, at its upper limit of travel, causes switch arm S1 to move to contact S1a. This deenergizes the motor. The right basket lift mechanism operates in the same way. Additional details of the structure and operation of a suitable basket lift mechanism are disclosed in U.S. Pat. No. 3,525,299, issued to Harry Gouwens and Earl Spillar, and assigned to General Electric Company.

Switch S102 is a double pole switch. The second pair of contacts is used to initialize the electronic control, that is, force the control into the power up mode. Switches S103, S104, S105 and S106 are operator switches. Switch S103 is used to select either the "Melt" or the "Fry" state of operation. Switch S104 (LCS) is used to cause the left basket lift mechanism to lower and to begin the cooking counter operation for that basket. Switch S105 (RCS) serves the same purpose for the right hand basket lift and counter. Switch S106 ($T_{HL}$) is used to initiate a test of the mechanical thermostat HSI.

Figure 3:
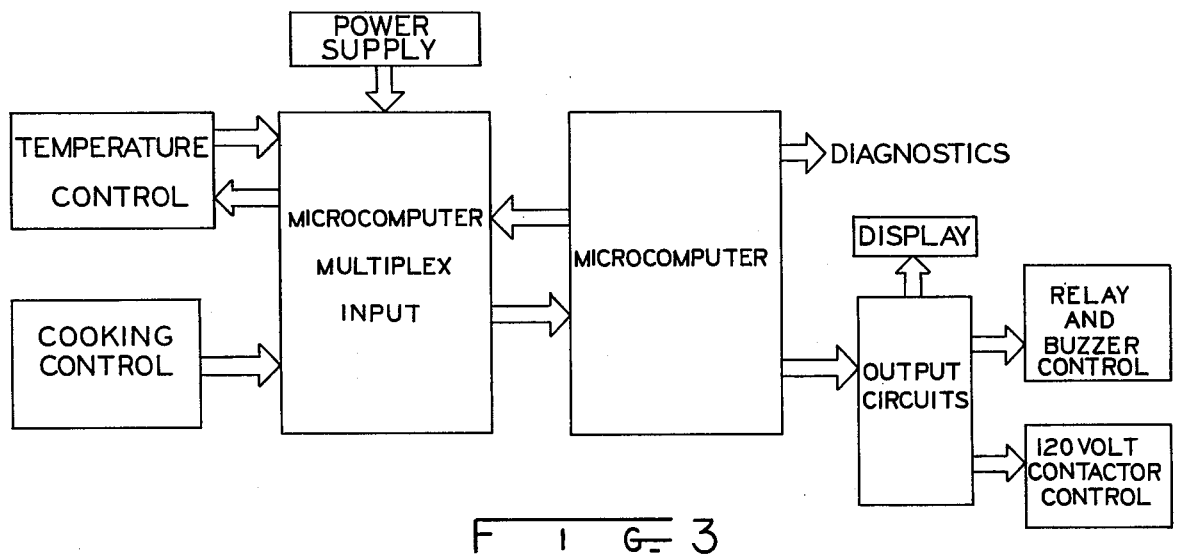
FIG. 3 is a schematic block diagram illustrating information flow in the electronic control portion of the circuit of FIG. 2.

FIG. 3 is a block diagram which illustrates the general paths of information flow between various components of the electronic control system. The arrangement is similar to the arrangement of the various sub-circuits in subsequent circuit diagrams.

The microcomputer multiplex input circuit includes the select switches S103, S104, S105 and S106. It also includes a diode matrix which is structured for each fryer to determine such parameters as melt on time, melt period time, high temperature test time, and idle off time and to customize the fryer for the desired power frequency. It also contains one or more diodes to determine the count of the cooking counters in the microcomputer.

The microcomputer multiplex input circuit also interconnects the microcomputer to the temperature control circuit. This control circuit, which includes thermistor probe R401, generates a voltage respresentative of the fluid temperature and compares it to each of four reference voltages. The comparison results are multiplexed into the microcomputer.

The cooking control circuit, which includes thermistor probe R801, generates a voltage which is representative of the fluid temperature and converts it to a series of pulses which are multiplexed to the microcomputer and counted.

The power supply provides a power line frequency signal as one data input. Several timer operations are performed within the microcomputer by counting zero crossings of this AC input voltage. To accomplish this, the multiplex input circuit connects the power frequency to the input of the microcomputer. When the microcomputer observes that the power line frequency signal changes state, it stores this in its ramdom access memory (RAM) and then executes a segment of the total program, which will consume about 2 milliseconds of time. The microcomputer then reconnects the power frequency to its input and waits to detect the next zero crossing. When that zero crossing is detected, it is stored in RAM and another segment of the internal program is executed. This operation continues until all of the program has been executed at which time it returns and repeats.

The microcomputer multiplex input circuit includes a computer monitor subcircuit which detects failure of the microcomputer to strobe or activate the multiplex inputs. If this condition occurs, contactor K1 is opened to deenergize the heaters.

The control system can be implemented in a number of ways, including using any one of a number of commercially available microcomputers. Exemplification control systems have been built and operated utilizing a digital large scale integration (LSI) circuit manufactured by Texas Instruments Incorporated and called the TMS1000 (designated A502 in the drawings).

The TMS1000 has 4 data inputs and 19 data outputs. The chip also contains an internal oscillator whose frequency is set by R517 and C507. In the exemplification control it operates at 250 KHz. The oscillator causes the internal logic to sequentially execute the program stored in the read-only-memory (ROM); which reads the input date, operates on that data and energizes particular output data lines. This operation is repeated over and over as the microcomputer sequentially steps through the program.

In order to place the desired program permanently into the microcomputer storage, the user typically provides Texas Instruments Incorporated with its particular application information which is then used to customize a mask used in fabricating the TMS1000 chips for that user. By this operation the desired application information is placed in permanent storage in the ROM of the microcomputer. In the subject control system the chip is programmed to execute the various routines illustrated in FIGS. 12–19. Additional details regarding the TMS1000 microcomputer may be had by reference to U.S. Pat. No. 4,074,351; issued to Gary W. Boone and Michael J. Cochran, on Feb. 14, 1978 and assigned to Texas Instruments Incorporated.

Figure 4:
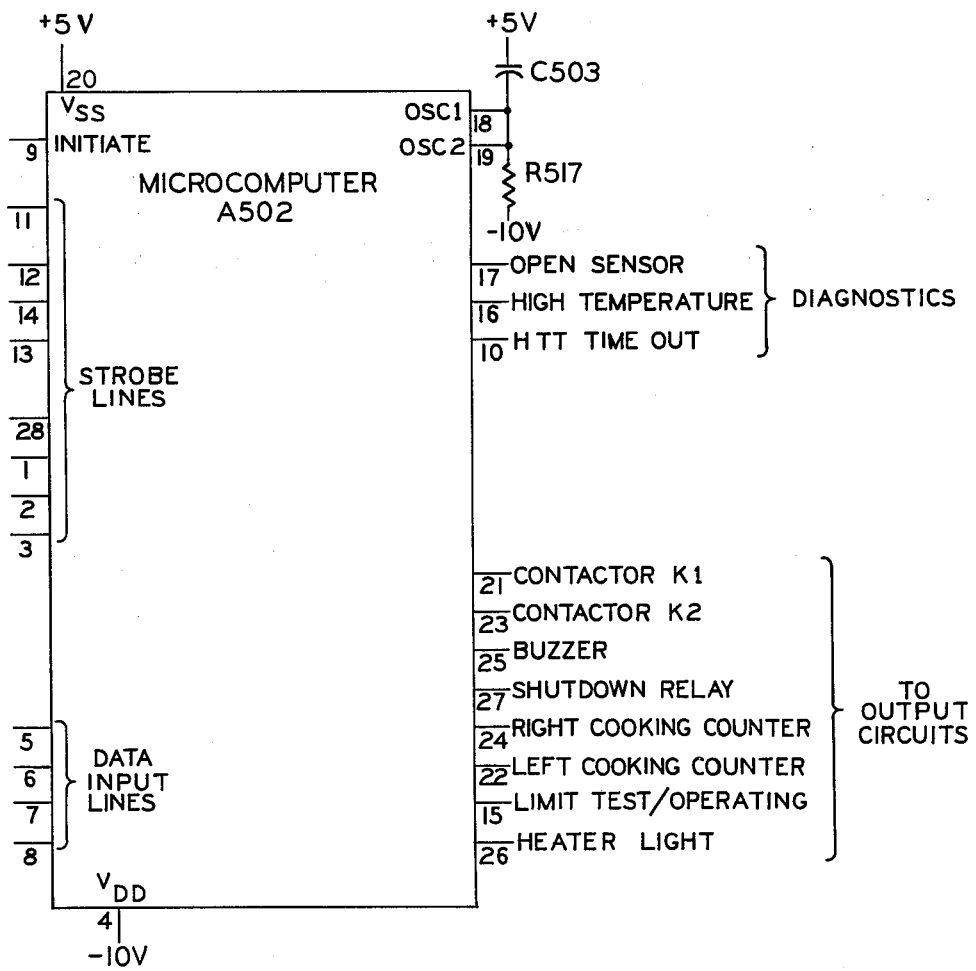
FIG. 4 is a schematic block diagram illustrating the connections of the microcomputer used in the illustrative embodiment of the present invention.

FIG. 4 is a schematic block diagram representing a TMS1000 microcomputer and showing the various connection pins or lines. In the drawing the lines have been given the number used by the manufacturer but have been rearranged and grouped by function.

Lines 4 and 20 are connected to power supply voltages.

Lines 1, 2, 3, 11, 12, 13, 14 and 28 are strobe lines and are used to cause the microcomputer multiplex input circuit to sequentially connect each of the data sources to the four data input lines 5, 6, 7 and 8. Each data source is strobbed every 0.1 seconds except the temperature comparison which is strobed every 0.4 seconds. Each strobe interval is approximately 100 microseconds in duration.

Eight data output line (15, 21, 22, 23, 24, 25, 26 and 27) drive control loads through the output buffer and contactor drive circuits. The particular control and/or indicator for each of these lines has been indicated. Lines 18 and 19 connect to the internal oscillator of the microcomputer.

When switch S102 (FIG. 2) is closed transistor Q502 (see FIG. 6) pulls pin 9 on the microcomputer positive for 10 to 20 milliseconds. This pulse initializes all logic within the microcomputer. Following this pulse, the microcomputer will proceed through the start-up sequence and into the control mode dictated by the input conditions.

Pins 10, 16 and 17 may be used by servicers in diagnosing a faulty condition sensed by the microcomputer, which has caused it to deenergize contactor coils KC1 and KC2.

Figure 5:
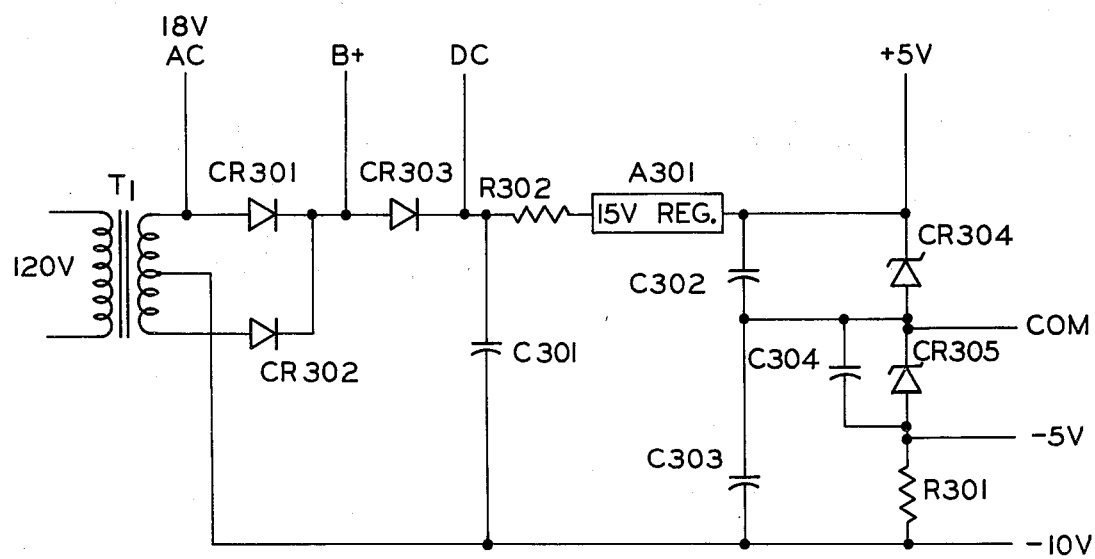
FIG. 5 is a schematic circuit diagram of the power supply portion of the illustrative embodiment control system.

FIG. 5 is a circuit diagram of the power supply circuit portion of the control system circuit. The power supply is energized from a 36 volt center tap winding on transformer T1. This provides a source of 18 volts AC from which to operate the buzzer. The B+ output from the power supply is full wave rectified and used to energize the 17 volt DC relays. The filtered DC output is used to energize the photo couplers in the contactor driver circuits. The DC voltage also energizes a 15V regulator Z301. The regulated 15 volts supply is subdivided with two 5-volt Zener diodes CR304 and CR305 to form a +5 V, −5 V and −10 V output busses. The microcomputer is energized between the +5 V and −10 V busses. The temperature control circuit operates from the +5 V and −5 V busses and the cooking control circuit operates from the −10 V buss. The connections of the various other circuits to the power supply are indicated in the various drawings by notation of the voltage level supplied.

Figure 6:
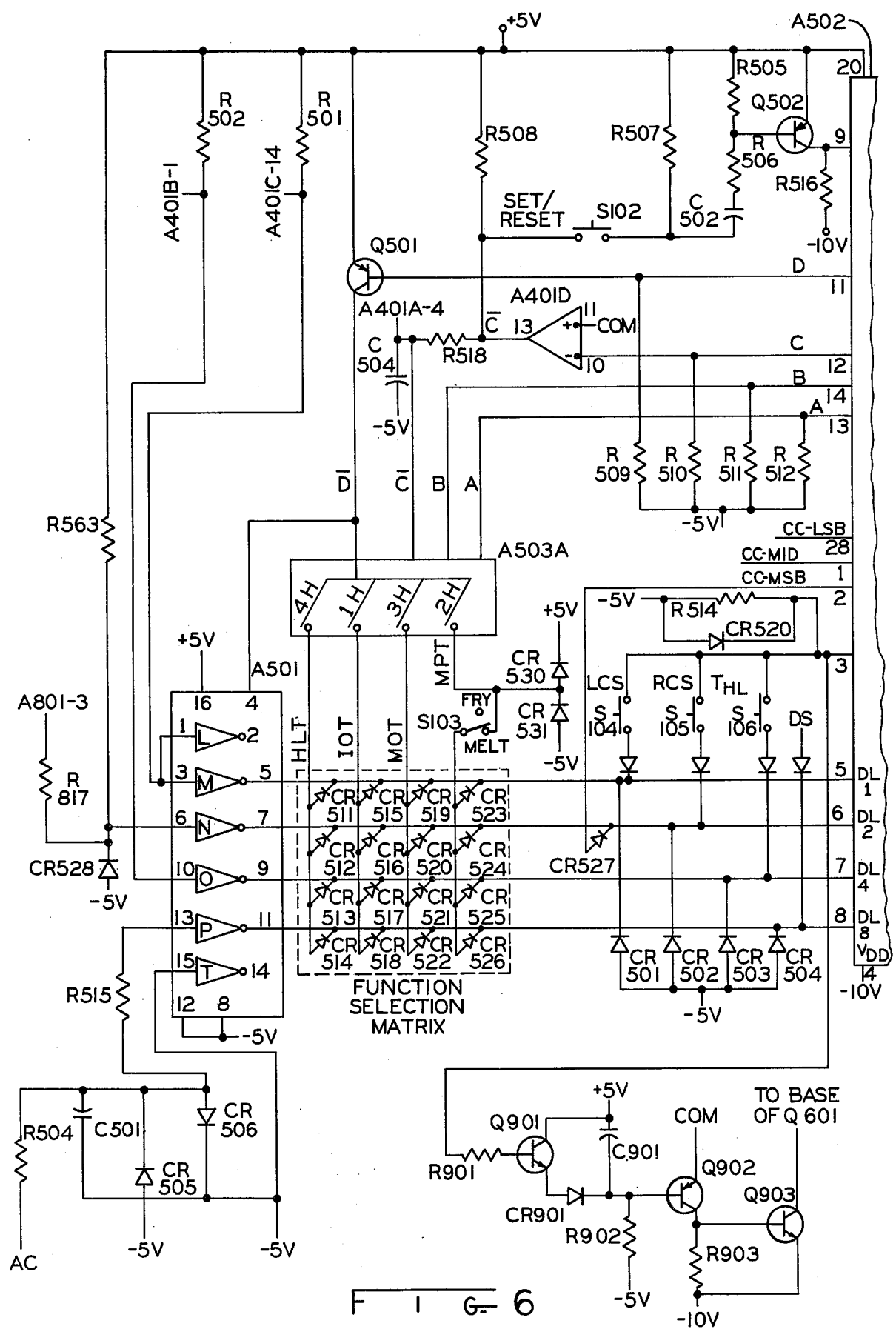
FIG. 6 is a schematic circuit diagram of the microcomputer multiplex input portion of the illustrative embodiment control system.

The microcomputer multiplex input circuit, including connections to the microcomputer, is illustrated in FIG. 6. The microcomputer multiplex input circuit connects different data sources to the four data input lines (pins 5, 6, 7 and 8) of the microcomputer.

The eight strobe lines (1, 2, 3, 11, 12, 13, 14 and 28) are connected internally of the microcomputer to the +5 V supply through transistors. Thus, each strobe line is either energized, that is connected to the 5 V supply, or floats. These lines are energized in sequence and in combinations to cause various data sources to be connected to the four data input lines, 5, 6, 7 and 8. To illustrate, assume that strobe line 3 is energized and that function switch S104 is closed. Under these conditions, data input line 5 would be high, while data lines 6, 7 and 8 would be low. The microcomputer will store this data and, at a later time in its program execution, utilize it to cause the appropriate outputs to be energized.

Microcomputer data lines conveniently may be designated as data lines DL1, DL2, DL4 and DL8 respectively because of the manner in which they function in reading numbers into the microcomputer. DL1 being high reads in the digit 1, DL2 reads in a 2, DL4 reads in a 4 and DL8 reads in an 8. Also they are added for any individual digit. Thus having a selected one or apporprite combination of these lines in a high state reads in any digit from 1 thru 9. Zero is read in by havaing all four lines low.

Internal to the microcomputer are two counters which accumulate pulses from the cooking control. Conveniently they may be referred to as the left counter and the right counter to correspond to their interrelationship with the left and right basket lift mechanisms.

When switch S104 is closed, it means that the operator has started the left counter. When the microcomputer detects the closure of S104, it strobes lines 2, 1 and 28 to read a number into the data input lines. A similar strobing action is accomplished when switch S105 is closed to start the right cooking counter.

The lines are strobed in sequence as indicated by the following labels:
CC-MSB . . . cooking counter, most significant bit
CC-MIB . . . cooking counter, middle bit
CC-LSB . . . cooking counter, least significant bit The number read into the microcomputer determines how many pulses must occur from the cooking control circuit before the cooking operation is done. In the exemplification embodiment each cooking counter counts 200 pulses. Thus a diode CR527 is connected between strobe line 2 (CC-MSB) and data input line DL2.

By connecting different combinations of diodes between strobe lines 2, 1 and 28 and data input lines DL1, DL2, DL4 and DL8, any number between 1 and 999 can be read into the microcomputer. For example, the number 349 would be coded as follows:

| STROBE LINE | DATA INPUT LINES | | | | DECIMAL VALUE |
|---|---|---|---|---|---|
| | DL1 | DL2 | DL4 | DL8 | |
| CC-LSB(28) | X | | X | | 9 |
| CC-MID(1) | | | X | | 40 |
| CC-MSB(2) | X | X | | | 300 |
| | | | | Total | 349 |

By connecting a suitable multipole, multi-position switch between these strobe lines and the data input lines the operator would be able to vary the cooking pulse count. A switch assembly of the type used for channel selections in citizen band radios would be acceptable for this purpose.

Strobe lines 14, 13, 12, and 11 are designated as A, B, C, and D respectively external to the microcomputer. These lines are used to strobe the remaining data into the microcomputer. Comparator A401D functions as an inverter as does transistor Q501. Thus, the outputs of these two inverters provide the signals $\overline{C}$ and $\overline{D}$. The signals A, B, $\overline{C}$ and $\overline{D}$ are used to control the operation of integrated circuits A503 and A501.

Figure 7:
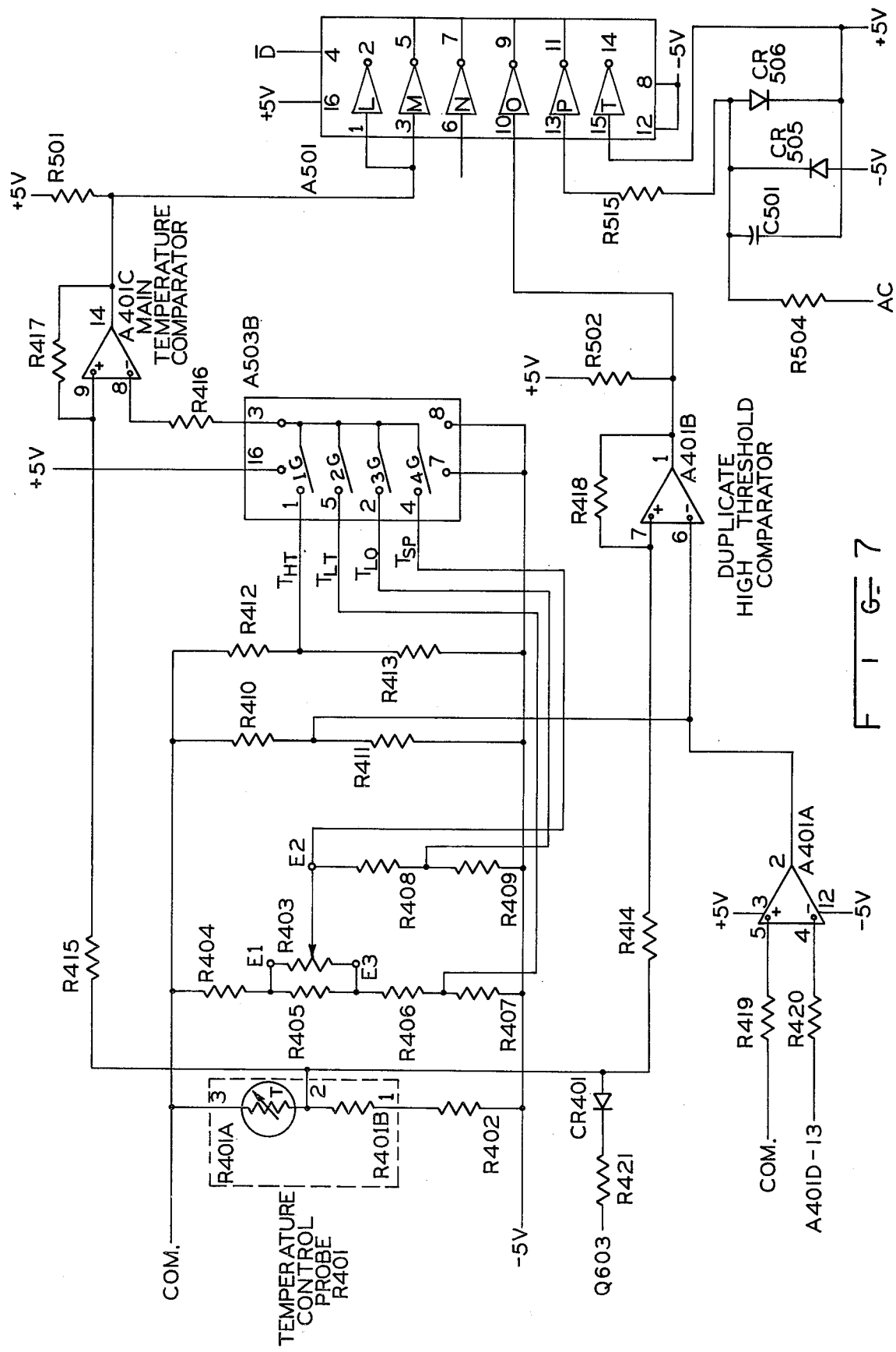
FIG. 7 is a schematic circuit diagram of the temperature control portion of the illustrative embodiment control system.

Integrated circuit A503 is a dual quad switch, half being schematically shown in FIG. 6 (A503A) and half being schematically shown in FIG. 7 (A503B). In actual practice it is a complementary metal oxide semiconductor array of transmission gates. For ease of illustration it has been schematically illustrated as a number of switches. Each switch in one half of the circuit operates with the companion switch in the other half. For instance 4G in A503B (FIG. 7) and 4H in A503A (FIG. 6) open and close together.

Integrated circuit A501 is a tri-state hex inverter; however, only four of the inverters (lettered M, N, and O and P) are used in this control system. The tri-state output permits its four output lines (5, 7, 9 and 11) to be floating when the voltage on its pin 4 is high. When the voltage on its pin 4 is low, the output voltages from the inverters M, N, O and P are the inverse of the input voltages on its inverter lines (pins) 3, 6, 10 and 13.

Integerated circuit A501 is used to connect both the temperature control circuit (FIG. 7) and the cooking control circuit (FIG. 8) to the microcomputer data input lines. Thus, for ease of understanding, inverter A501 has been included in each of FIGS. 6, 7 and 8.

Consider now in more detail the operation of integrated circuit A503. When $\overline{D}$ is high integrated circuit A501 is disabled and no signals will be transmitted from the temperature control circuit regardless of the state of switches 1G, 2G, 3G and 4G. In this case the information placed on data input lines DL1, DL2, DL4 and DL8 is governed by which of switches 1H, 2H, 3H and 4H are closed. When $\overline{C}$ is high all four switch pairs will be open regardless of the state of A and B. When $\overline{C}$ is low the signals on A and B can be varied to cause the switch pairs to close in sequence. As 1H, 2H, 3H and 4H are closed the high signal on $\overline{D}$ is transmitted to the A503A output lines for selective communication to data input lines DL1, DL2, DL4 and DL8. The labels on these output lines indicate the information involved as follows;

HLT—High temperature test time
IOT—Idle off time
MOT—Melt on time
MPT—Melt period time The input to the data input line is finally determined by the function selection matrix; an array of diodes for selectively connecting each of the A503A output lines to each of the data input lines.

While, for purposes of illustration, the full matrix is shown, individual diodes are omitted from the matrix to modify the input information.

The information inputed to the microcomputer by the matrix in the exemplification embodiment is shown in the following chart.

Integrated circuit A501 also couples other inputs to the data input lines. AC supply voltage is fed through invert P to data input line DL8. Filter R504, C501 removes transients from this AC voltage. The microcomputer counts zero crossings of this signal for its basic timekeeping functions. Inverters M and O couple signals from the temperature control circuit to data lines DL1 and DL4 while inverter N couples information from the cooking control to data line DL2.

The microcomputer monitor circuit, including transistors Q901, Q902 and Q903, detects if the microcomputer is not strobing and opens contactor K1. This prevents power from being applied to the heaters. The monitor circuit is driven by the push button strobe line A502-3 which is "high" for about 30 microseconds each 0.1 seconds. During this interval, Q901 discharges C901 and thereby holds both Q902 and Q903 off. If strobing ceases, C901 will charge causing both Q902 and Q903 to turn on. Q903 is connected to the base of Q601 (FIG. 10), thus conduction of Q903 causes contactor K1 to open.

The line DS, connected to data input DL8 may be used by a servicer to cause the individual outputs to be energized in sequence.

The temperature control circuit, illustrated in FIG. 7, includes several resistance bridges which share a common thermistor probe. The control probe R401 consists

| FUNCTION | | MICROCOMPUTER (A502) DATA INPUT LINES | | | | COMMENT |
|---|---|---|---|---|---|---|
| | | DL8 | DL4 | DL2 | DL1 | |
| Melt On | Seconds | 1.6 | 0.8 | 0.4 | 0.2 | Total times - 1 sec.+ |
| Time | Diode | CR522 | CR521 | CR520 | CR519 | selection |
| Melt Period | Minutes | 80 | 40 | 20 | 10 | Total time - 5 min. |
| Time | Diode | CR526 | CR525 | CR524 | CR523 | + selection |
| High Limit | Seconds | 96 | 48 | 24 | 12 | Total time - 60 sec. |
| Test Time | Diode | CF514 | CR513 | CR512 | CR511 | + selection |
| Idle Off | Minutes | | 40 | 20 | 10 | Total time - |
| Time | Diode | | CR517 | CR516 | CR515 | selection |
| Input | Frequency | 60 Hz | | | | Remove diode when |
| Power | Diode | CR518 | | | | power will be 50 Hz. |

With the exemplification embodiment of the invention, the actual diode inclusion for a particular fryer is determined at the time of manufacture. A sub-array with a selection switch could be used for any function if it was desired to provide the operator with a selection option.

It should be noted that the melt period time (MPT) line connects A503A and the diode matrix through the melt-fry selection switch S103. When S103 is in its melt position (closed) the predetermined melt period time will be read into the microcomputer. When switch S103 is in its fry position (open), no melt period time will be read into the microcomputer.

When the switches in A503A are closed in sequence to read in each of the four groups of diodes, the bank of four switches in A503B, which is connected in the temperature control, are also operated. However, that information does not reach the microcomputer because A501 is disabled by $\overline{D}$ being high.

When signal line $\overline{D}$ is low integrated circuit 501 is enabled and its outputs become active. While the switches which are in A503A are still active, no information flows through them because their common lead is connected to $\overline{D}$, which is at a low voltage. Thus the diodes in the function selection matrix are all in their blocking state.

of thermistor R401A, connected in series with a calibrating resistor R401B. The probe, in series with resistance R402, forms a half bridge with the output at terminal 2 of the probe. The voltage on terminal 2 of the probe is sequentially compared with each of four reference voltages by comparator A401C.

The control probe is submerged in the cooking fluid and is calibrated so that its voltage is representative of the temperature of the cooking fluid. The reference voltages provided by the bridges are representative of certain predetermined temperatures of the cooking fluid, as follow:

$T_{SP}$—set point temperature, selected by the operator (or factor) for cooking the particular food, conveniently it is in the range of about 280° F. to about 420° F.

$T_{HT}$—high limit temperature, a temperature above the highest set point temperature and below the operating temperature of the mechanical overtemperature thermostat, fluid temperature above this level will cause the control system to shutdown, conveniently it may be about 450° F.

$T_{LO}$—overload temperature, a percent of the set point temperature which indicates that a food load has dropped the fluid temperature an excessive amount, conveniently it may be about 85% of the set point temperature.

$T_{LT}$—low limit temperature, a minimum fluid temperature, at the end of a melt operation a fluid temperature below this level will cause the control system to go to shutdown; conveniently it may be about 100° F.

The high limit temperature reference occurs at the junction of resistors R412 and R413. The low threshold temperature reference occurs at the junction of resistors R406 and R407. The set point reference is obtained from the wiper on the temperature control potentiometer R403. The overload reference is proportional to the set point reference and is obtained at the junction of resistors R408 and R409.

The respective reference voltages are sequentially connected to pin 8 of a comparator A401C by the switches in integrated circuit A503B. Assume that pins 1 and 3 on A503B are connected by the internal switch 1G. If the temperature of the thermistor R401A is higher than the high limit temperature the voltage on pin 2 of the control probe R401 will be more positive than the high limit temperature reference voltage. The output of comparator A401C will be high and data line DL1 into the microcomputer will be low. Conversely, if the temperature of thermistor R401A is lower than the high limit temperature, data line DL1 will be high. In a similar manner, the microcomputer sequentially determines whether the temperature of thermistor R401A is above or below each of the other reference temperatures. The microcomputer stores this information after each strobe cycle for use later in the program sequence to determine which control outputs to energize. Resistor R421 and diode CR401 introduce a small amount of hysteresis into the temperature measuring bridges to reduce the possibility of contactor chatter.

During execution of the microcomputer program, the output data from comparator A401C is also evaluated against what is expected. For example, assume that the voltage on pin 2 of the probe R401 should become effectively connected to either the common power supply rail or the −5 V supply rail because a junction in the probe has opened or shorted. Under these conditions, the output of the comparator A401C will not have the correct logic level for some of the four comparisons which are made during a strobing interval. The microcomputer can, thus, detect that something is wrong and latch into an electronic shutdown state. In this condition, both contactors will be de-energized and a display indicator LD702 (FIG. 9) will be on. In order to exit the electronic shutdown state, the operator must depress switch S102 to initialize the microcomputer. A similar error signal will occur if any of a number of the resistors associated with the reference temperature voltages should become open circuit or short circuit.

A further comparison of the high limit temperature is made by a redundant circuit. A duplicate high limit reference voltage is obtained at the junction of resistors R410 and R411. Comparator A401B duplicates the high limit comparison made by comparator A401C. Its output is fed independently into the microcomputer through inverter O of A501 to data line DL4.

At one point during the strobing interval comparator A401A drives comparator A401B such that its output should be representative of a fluid temperature above the high limit temperature, regardless of the voltage of the temperature control probe. Failure of this to occur will be recognized by the microcomputer as a failure in the temperature control circuit and the microcomputer will go into electronic shutdown.

The four comparators A401A, A401B, A401C and A401D have been so numbered because, in the exemplification embodiment, they were all implemented with a single integrated circuit.

The time/temperature cooking characteristic of food follows the Arrhenius Equation. This equation may be expressed as $LnK=(E/RT)+LnA$ where K is the rate constant, E is the activation energy, R is gas constant, T is absolute temperature and A is a frequency factor constant.

A given "doneness" can be achieved with different combinations of time and temperature. The cooking control circuit illustrated in FIG. 8 measures a cooking time period, the length of which is a function of the cooking fluid temperature and "crisp" control setting. The crisp control permits operator selection of the desired degree of doneness for different food products.

The cooking control provides a series of output pulses which vary in frequency as the cooking fluid temperature varies. These pulses are fed to the microcomputer which counts them. In the exemplification the microcomputer has two counters, one for each basket lift mechanism.

Each counter is manually initialized and preset to a fixed count when a basket of food is immersed in the fat by depression of switches S104 and S105. When the preset count is reached, an indicator is energized and, in automatic basket lift models, the lift mechanism raises the basket. The indicator is de-energized by resetting the counter. The two counters and indicators operate independently and provide time intervals that are a function of the average oscillator frequency (temperature) during the time that counter is enabled.

The frequency of the oscillator is a function of both fluid temperature and the "crispness" control setting. As temperature decreases, oscillator frequency decreases in a predetermined manner to yield essentially constant "doneness." The "crispness" control provide a continuously variable multiplier of the temperature dependent oscillator frequency. Thus, the "crispness" control adjusts the base oscillator frequency to properly match a wide range of cooking times for different foods and different degrees of "doneness."

Figure 8:
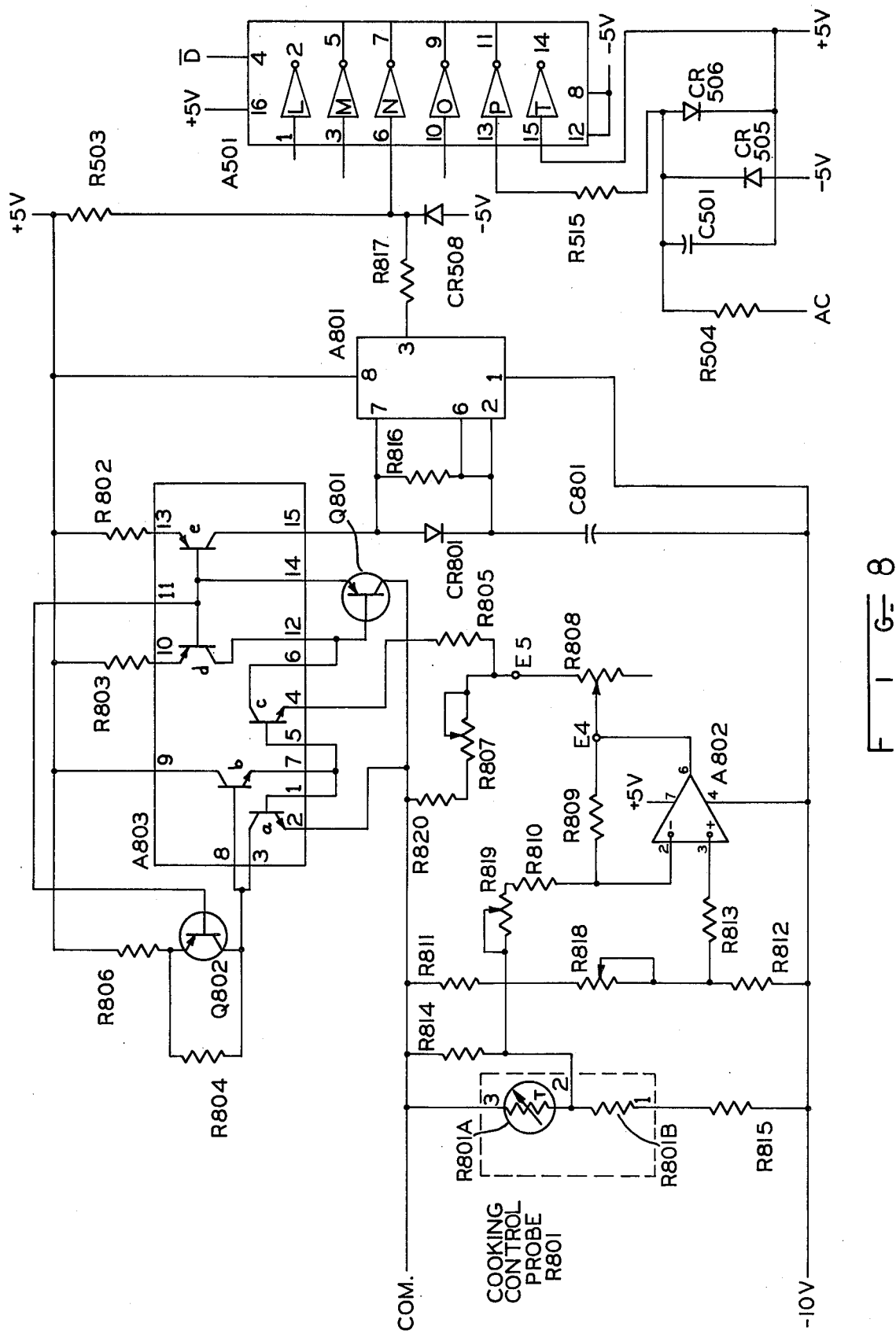
FIG. 8 is a schematic circuit diagram of the cooking control portion of the illustrative embodiment control system.

Referring now to FIG. 8, the output of amplifier A802 is a dc voltage measured with respect to the "COM" bus. This voltage at terminal E4 consists of a fixed value plus a value that is logarithmically dependent upon the temperature of thermistor R801A in the cooking control probe R801. The probe is immersed in the cooking fluid and its voltage is representative of the cooking fluid temperature. The fixed voltage is developed across resistors R811 and R818. Resistor R818 is adjustable to provide for calibration.

Thermistor R801A is connected in a bridge circuit consisting of resistors R801B, R815, R812, R818 and R811. The bridge unbalance voltage is amplified by A802 and algebraically added to the fixed voltage described above. Resistor R819 is adjustable to provide calibration.

Resistor R814, connected in parallel with thermistor R801A, reduces the sensitivity of the bridge to changes in thermistor temperature. Resistor R801B is a part of the probe assembly and is selected for each probe to compensate for differences in the absolute value of thermistor resistance.

The "crisp" control provides a means for positioning the time/temperature response curve along the time axis. That is the 3:1 variation in cooking time due to change in cooking fluid temperature can be made to occur over up to a 7:1 range of time by adjustment of the "crisp" control.

The attenuator consists of resistor divider R807, R820 and R808. As the "crisp" control wiper arm is moved along R808, the voltage at terminal E5 is varied due to voltage divider action. Resistor R807 provides a means for calibrating the range of crisp control R808.

The voltage at E5 controls the operation of a voltage to current converter which delivers to oscillator A801 a current which is proportional to the voltage E5. In the exemplification embodiment the voltage to current conversion is implemented with circuitry including an integrated circuit A803. In FIG. 8, the individual transistors of the integrated circuit are shown inside the box labeled A803 and are labeled as a, b, c, d and e. In the specification they are called A803a, A803c, A803d and A803e.

The operation of the voltage to current converter can be easily understood by assuming:
1. Equal emitter currents in the same type of transistor produce equal base-emitter voltages.
2. Current gain of transistors is relatively high.
3. R802=R803=R806

A reference voltage is produced by Q802, A803a, A803b and a current mirror is produced by A803d, A803e and Q801. The reference voltage maintains the emitter of A803c at the "COM" bus potential. This makes the current through R805 proportional to $V_{E5}$.

Due to circuit symmetry, the collector currents in A803d and A803e equal the collector current in A803c. Transistor Q801 is an emitter follower which supplies base current for A803d and A803e and has negligible base current compared to the collector current of A803c.

The reference voltage is generated by forcing transistor A803a to carry the same magnitude of current as A803c. Due to symmetry, A803a and A803c will have the same base-to-emitter voltages. This assures that the emitter of A803c operates at the potential of the "COM" bus.

The base of Q802 is connected to the same potential as the base of A803d and, by symmetry, operates at the same collector current as A803c, A803d and A803e. If we momentarily ignore the current through R804, the collector currents of Q802 and A803a are equal. Transistor A803b is an emitter follower which supplies base current to A803a and A803c and has negligible base current compared to the collector current of Q802.

Circuit operation is predicated on all transistors being active. This may not be true during startup so R804 assures that a small current is available to drive the reference circuit and allow the converter to move to the normal operating current set by the current through R805. This starting current has negligible effect on the symmetry between the input current through R805 and the output current.

The output current through pin 15 of A803 drives an oscillator circuit. The oscillator circuit is of the relaxation type and may be implemented using an integrated circuit oscillator A801. The voltage across integrating capacitor C801 varies between two values of voltage identified as $V_{max}$ and $V_{min}$. These voltages are fixed fractions of the power supply voltage applied to the integrated circuit A801. Capacitor C801 charges from the current received from transistor A803e. When the voltage across C801 reaches the level $V_{max}$, the integrated circuit A801 causes capacitor C801 to discharge through resistor R816. When the voltage across C801 reaches $V_{min}$, the integrated circuit allows the capacitor to again charge. The period of oscillation of the oscillator circuit consists of two time intervals, one fixed and one variable. The fixed time interval is proportional to the R816, C801 product. This pulse width is then separated by an adjustable or variable time interval inversely proportional to the current from the voltage to current converter. In actual practice, the adjustable time interval is large compared with the fixed time interval, and, thus, the period of time is inversely proportional to the current. The current, in turn, is responsive to the temperature of thermistor R801A.

The dual counters are implemented in microcomputer A502. The oscillator output and signals from switches S104 and S105 are multiplexed into the microcomputer. When either S104 or S105 is depressed to lower the corresponding food basket the corresponding cooking counter is preset to a count of 200, by diode CR527, and proceeds to count down. When a zero count is reached, the appropriate output indicator circuit is energized. This output is reset to off by momentarily depressing one of the switches S104 and S105.

If desired, the product selection or "crispness" control could be obtained by adjusting number of pulses to be counted rather than by modifying the temperature responsive signal.

Figure 9:
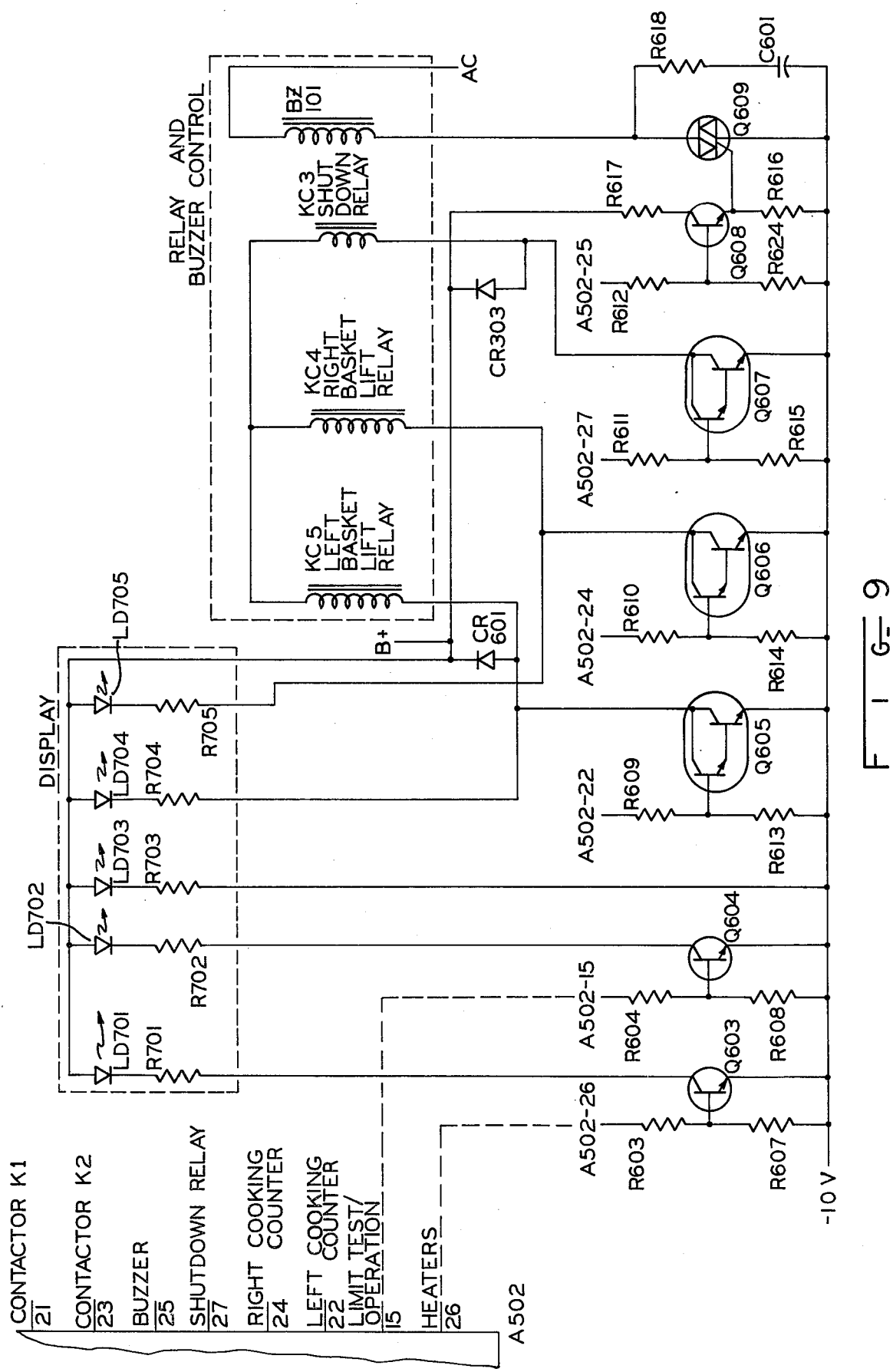
FIG. 9 is a schematic circuit diagram of a portion of the output buffer circuits and associated indicators, relays and buzzer actuation circuits of the illustrative embodiment control system.
Figure 10:
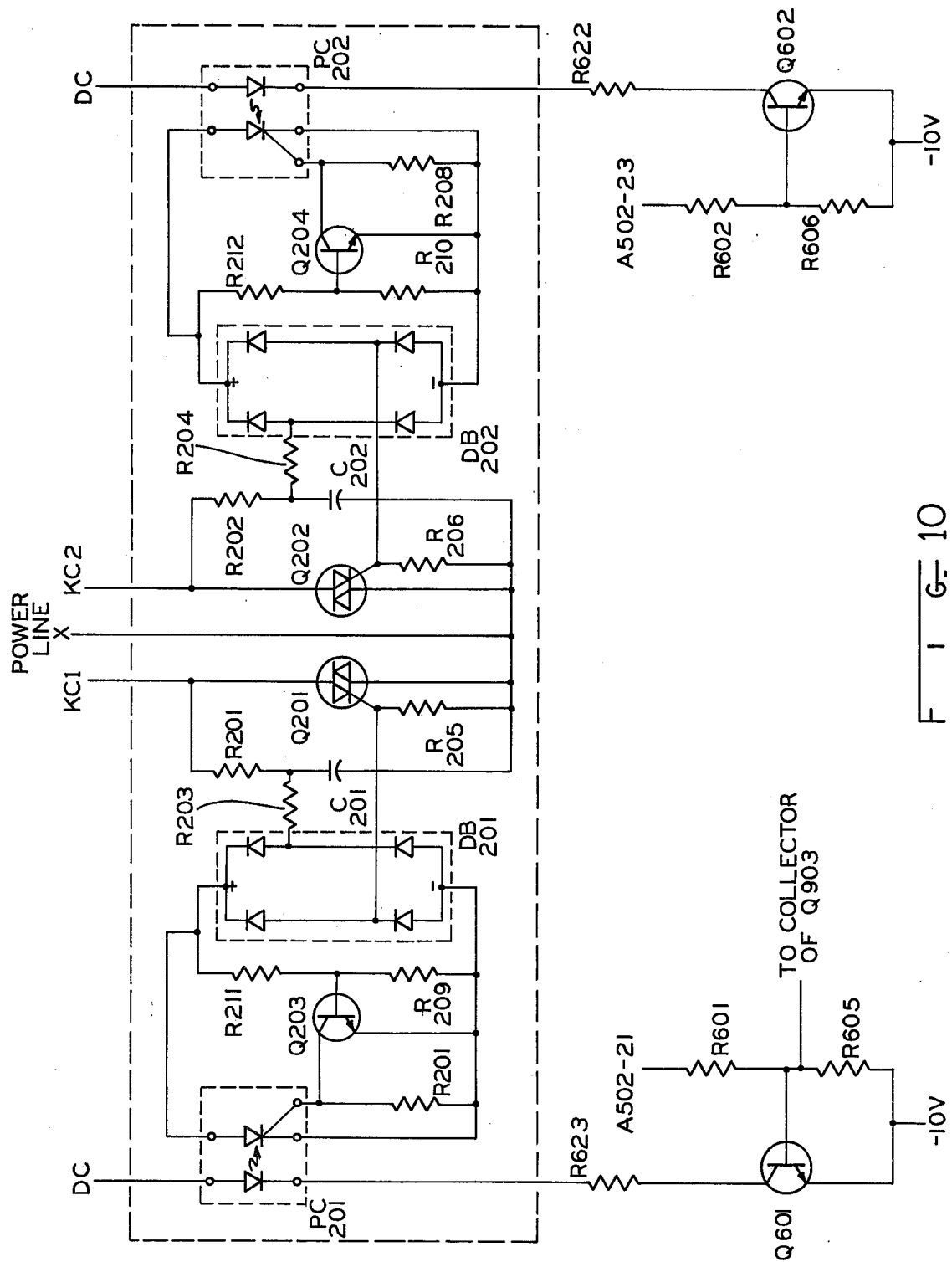
FIG. 10 is a schematic circuit diagram of the remaining buffer circuits and associated contactor actuation circuits of the illustrative embodiment control system.

The output circuits, as shown in FIGS. 9 and 10, provide a buffer between the microcomputer and the various loads on the control. The eight functional outputs are connected to pins 21, 23, 25, 27, 24, 22, 15 and 26 of the microcomputer. The connections between individual buffer circuits and the corresponding microcomputer output pin are indicated by labeling the buffer circuit leads. For instance A502-26 at the lead to the base of Q603 indicates it is connected to pin 26 of microcomputer A502. Additionally for illustration, the connections from pins 26 and 15 have been shown in dotted line.

Internally of the microcomputer, each of the output pins is connected to the +5 V supply by a metal oxide semiconductor (MOS) transistor. Thus, the output can either be electrically tied to the +5 V supply or, if the transistor is off, the output floats. Thus if pin A502-26 is energized, that is connected to the +5 V supply, transistor Q603 will be energized and in the display module LD701 will be energized. If pin A502-22 is energized, transistor Q605 will be turned on. This will cause LD704 in the display module to glow, and, in addition, will energize relay coil KC5. Diodes CR601, CR602 and CR603 are connected across the relay coils to provide transient voltage suppression for the driving transistors. When pin A502-26 is energized, transistor Q608 turns on, causing triac Q609 to energize buzzer coil BZ101.

The main contactor coils KC1 and KC2 operate on 120 volts and are energized by two conventional solid state relay circuits as shown in FIG. 10. The 120 volt circuits are electrically isolated from the low voltage control circuits by use of photo couplers. To understand the operation of the buffer circuit for contactor K1, assume that terminal A502-21 is energized. This will cause transistor Q601 to energize the light emitting diode in photo coupler PC201 and the SCR in photo coupler PC201 will be in the on state. Triac Q201 is the solid state switch in series with contactor coil KC1. Current to trigger this triac flows through resistor R201, R203, diode bridge DB201, the SCR in photo coupler PC201 and again through diode bridge CB201 into the gate of triac Q201. Thus, at the beginning of each electrical cycle when the anode voltage on the triac reaches about 7 volts, sufficient current will flow to trigger the triac to the on state. If terminal A502-21 is de-energized, Q601 will be off and the SCR in the photo coupler will be in the blocking state. As a result, trigger current cannot flow into the gate of triac Q201 and the triac will remain in its blocking state.

Transistor Q203 provides a means to inhibit the operation of the SCR in the photo coupler at all times, except when the instantaneous voltage across the SCR is less than 7 volts. This provides for zero crossing triggering of the triac as well as reducing the sensitivity of the SCR to transient voltages.

The five indicators LD701, LD702, LD703, LD704 and LD705 are light emitting diodes and are positioned in a suitable marked display to indicate the status of the cooking appliance. LD701 is a heater indicator. When the appliance is in its cooking state of operation LD701 glows when the heaters are energized. In the cooking appliance melt state of operation LD701 blinks continuously. LD703 is an start/reset (on) indicator and it glows whenever the control circuit is energized. LD704 glows when the left cooking counter is counting. When the count is complete it goes off and the buzzer BZ101 sounds. LD705 and the buzzer function in the same way for the right cooking counter. LD702 is a multi-purpose signal. It will blink continuously during a high temperature test of the mechanical thermostat. In the cooking state of operation it will blink continuously if the fluid temperature is below the overload temperature. It will glow continuously in any of the following situations: fluid temperature is above the high limit temperature (except during the high temperature test); the fluid temperature is below the low limit temperature at the end of a timed melt operation or after 90 seconds in the cooking state; or the thermostat contacts fail to open during the high temperature test.

In addition to the five status indicators, there are six control outputs. The BUZZER output (A502-25) supplies 18 V RMS to a buzzer coil (BZ101). The BUZZER output is energized when the right cooking control time-temperature calculation is completed, when the left cooking control time-temperature calculation is completed, or when a malfunction is detected in the cooking control.

The BUZZER output is de-energized by momentarily depressing either of switches S104 or S105.

The SHUT DOWN RELAY output (A502-27) energizes the 17 V DC relay coil KC3. The normally open contacts of relay K3 carry 120 V AC power to the control and container coils. The SHUT DOWN RELAY output is energized when the control circuit is initialized. The SHUT DOWN RELAY output is de-energized if the fryer idles for a pre-selected idle off interval.

The RIGHT COOKING CONTROL output (A502-24) energizes the 17 V DC relay coil KC4. The contacts of relay K4 are in the right automatic basket lift circuit. The RIGHT COOKING CONTROL output is energized only when the right cooking counter is active.

The LEFT COOKING CONTROL output (A502-22) energizes the 17 V DC relay coil KC5. The contacts of relay K5 are in the left automatic basket lift circuit. The LEFT COOKING CONTROL output is energized only when the left cooking counter is active.

CONTACTOR 1 output (A502-21) and CONTACTOR 2 output (A502-23) energize the 120 V AC coils KC1 and KC2 respectively of contactors K1 and K2. Both outputs are energized to apply heat to the fryer. The outputs are de-energized alternately during normal operation of the control system. Both contactors are de-energized on the occurrence of any of the conditions which cause indicator LD702 to glow continuously.

An operator of a deep fat fryer may choose to use solid shortening or a liquid cooking fluid. If solid shortening is used it must be melted before food can be cooked. During the melting operation low energy level heat should be applied to avoid harming the shortening. Also an operator may try to start or restart a cooking appliance when the cooking fluid is at any point in a wide temperature range. The present control system takes these and other factors into account and automatically controls operation of the cooking appliance.

Figure 11:
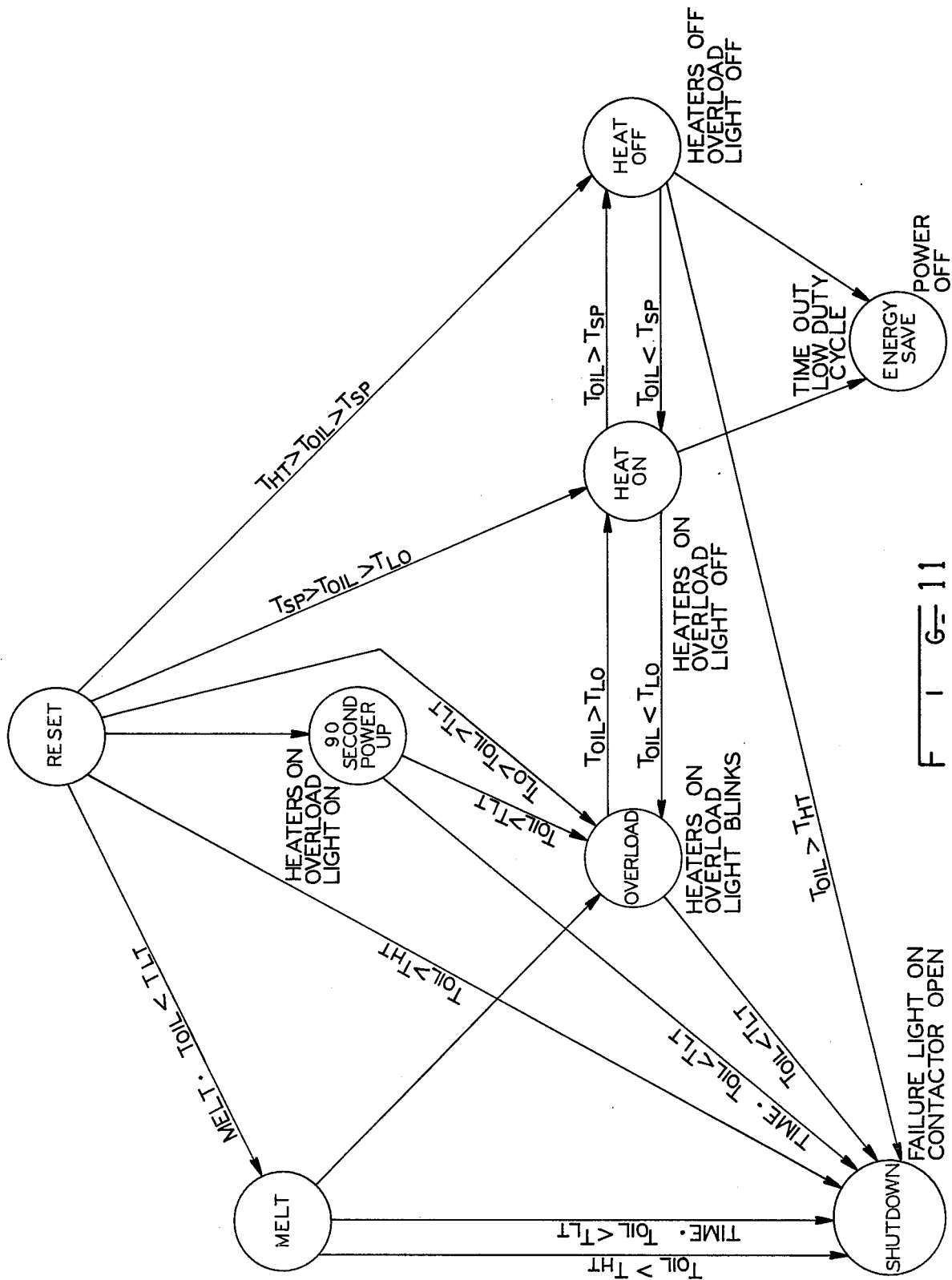
FIG. 11 is a state diagram illustrating the temperature control function of the present invention, it shows various stable operational states and conditions for transitioning from one state to another.

FIG. 11 is a state diagram which illustrates various control functions of the present control system. In indicates stable states that the control system can be in. The lines and arrows indicate transitions from state to state and the conditions that determine when such transitions occur.

Powering up the control by depressing switch S101 initializes the system into the reset state. Upon being reset, the control system moves on a path from the reset state into one of the other state. For discussion, proceed around these paths in a counter-clockwise fashion. The first path that could be taken leads into the melt cycle state. The conditions for going from reset to melt are that the melt cycle is selected by switch S103 and that the temperature of the fluid is less than $T_{LT}$.

The next path out of the reset state would be to the shutdown state. If the control system determines that the temperature of the fluid is above $T_{HT}$, then the control system goes from the reset state to the shutdown state.

The third path from the reset state goes into a 90 second power up state when fry has been selected. The control stays in this state until 90 second timer has timed out. At the end of 90 seconds, if the temperature of the fluid is not above the $T_{LT}$, the control system goes into the shutdown state. If, however, the temperature of the fluid is above $T_{LT}$, the control system goes to the overload state. The purpose of the 90 second power up state is to assure that the temperature control probe is functioning. On initial start-up a faulty probe could result in the same signal as cold cooking fluid. The 90 second power up assures that the fluid temperature rises above $T_{LT}$. If the control system does not sense this change it automatically goes to shutdown.

The fourth path from the reset state is when fry has been selected and the temperature of the fluid is above $T_{LT}$ but is below $T_{LO}$. In this case the control system goes directly from reset into the overload state. The fifth path from the reset state is when the temperature of the fluid is below $T_{SP}$ but above $T_{LO}$. This path leads to the heat on state. The last path from the reset state is when the temperature of the fluid is above $T_{SP}$ but below the $T_{HT}$. This path leads to the heat off state.

The heat off, heat on and overload states or conditions cumulatively constitute the cooking (fry) state of appliance operation. The control system normally is alternating between the heat off state, in which the fluid temperature is greater than $T_{SP}$ and the heaters are off, and the heat on state, in which the fluid temperature is less than $T_{SP}$ but above $T_{LO}$ and the heaters are on. If the temperature drops below $T_{LO}$ the heaters stay on and LD702 blinks continuously to alert the operator to the overload condition. It continues to blink until the fluid temperature rises above $T_{SP}$. For example, the fluid temperature would drop below $T_{LO}$ if the operator placed too large a load of food in the appliance. If such a load is left in the appliance it will eventually cook. However, the quality may be adversely affected. For instance, in a deep fat fryer an excessively low temperature can increase the fat absorption of the food.

If the control system is in the cooking state and detects that the temperature of the fluid is below $T_{LT}$ the control system will go to shutdown. If the control system detects that the fluid temperature is above $T_{HT}$, and the high temperature test has not been initiated, the control system will go to shutdown.

As the control alternates between the heat on and heat off states it constantly monitors the duty cycle of the heaters. If the duty cycle of the heaters is less than a set rate (14.3% for example) for greater than a selectable period of time (approximately ½ hour for example) the control will turn itself off (de-energize relay KC3) and go into the energy save mode, as the duty cycle indicates the fryer is not being used.

Returning finally to the melt state, the normal termination of the melt state is that the melt period time is completed and the fluid temperature is above $T_{LT}$. Under these conditions the control system goes from the melt state to the overload state. If, for some reason, while in the melt cycle state, the fluid temperature goes above $T_{HT}$, the control goes into shutdown. If, when melt cycle time expires, the temperature of the fluid remains below the $T_{LT}$, the control system also will go into shutdown state.

The flow charts of FIGS. 12-19 illustrate the manner in which the microprocessor obtains the various items of information, stores and processes them and enables the appropriate outputs. Briefly described, the various routines are as follows:

Power Up and Input Strobes (FIG. 12)—Resets the hardware and initializes the memory. It then reads in the parameters in the diode matrix.

Shutdown (FIG. 13)—It is the routine which is entered when a fault is detected.

50/60 Cycle Counter (FIG. 14)—This routine counts the power line frequency and divides by 50 or 60 as appropriate. It is the path into other routines of the program, running through each of the others in 0.1 second intervals.

Cooking Counter (FIG. 15)—Updates (decrements from 200) each cooking counter and compares each to the number 000 to determine when each cooking counter has timed out.

Input pushbutton (FIG. 16)—Strobes the data inputs, pushbuttons and cooking control circuit.

Timer Update (FIG. 17)—Increments all of the time base counters.

Main Control (FIGS. 18A and 18B)—Makes all the control determinations for the temperature control of the fryer.

Output (FIG. 19)—Causes the outputs of the microcomputer to change state as directed by the internal flags set in the other routines.

The following abbreviations are used in the flow charts:

| Abbreviation | Meaning |
| --- | --- |
| C | Count |
| CC | Cooking Counter |
| CCL | Left Cooking Counter |
| CCR | Right Cooking Counter |
| C1P | Clock Pulse |
| D | Input from 50/60 cycle counter, D=0 indicates 1 second has passed since last D=0 signal |
| DO | Delayed Off |
| HT | High Limit Temperature |
| HTT | High Temperature Test |
| IOT | Idle Off Time |
| KC1 | Contactor Coil 1 |
| KC2 | Contactor Coil 2 |
| LO | Overload Temperature |
| LSB | Least Significant Bit |
| LT | Low Limit Temperature |
| MC | Melt Cycle |
| MCT | Melt Cycle Time |
| MID | Middle Bit |
| MSB | Most Significant Bit |
| OC | Power Up |
| PB | Push Button |
| PBS | Push Button Strobe Line |
| SP | Set Point Temperature |
| Temp. | Temperature |

It will be understood that, as used herein, "set" means to place in a high or active state and "reset" means to place in a low or inactive state.

The Power Up and Input Strobes Routine (FIG. 12) begin with the actual hardware reset by the start switch. When reset occurs, the status latch (a bit of storage in the microcomputer) is reset. Next all flags are preset into the state that is desired for the power up condition. Then the shutdown relay KC3 is pulled in so that the control system will remain on.

The control system then zeroizes appropriate portions of the memory and presets selected portions of the memory to conditions for beginning the program. The control system then reads in parameters that are stored in the diode matrix. The first of these is the delayed off time which includes the 50/60 cycle flag. As this portion of the program is executed repeatedly in the course of the operation of the machine, care is taken that the various constants are not read in when the counter with which they are associated is being used. This is the reason for a number of the decision blocks. For instance, the melt enter decision block is used so that, if the microcomputer is in a melt cycle, it will not continue to read in the melt cycle time but will decrement that counter in the microcomputer. However, anytime that the microcomputer is not in the melt cycle, it will repeatedly read in the parameters that have been assigned to the melt cycle. In order to achieve the times desired in the exemplification, the melt on time is first converted to decimal, then doubled and one second is added to it. At the end of each routine segment, if it says exit, the control system will go to the beginning of the 50/60 cycle counter routine and wait for the next cycle transition to count the 50/60 line and to begin the next segment of the program.

During electronic shutdown, relay K3 and the control system remain energized while K1 and K2 are opened to deenergize the heaters. This routine is shown in FIG. 13. Entry into this section of the program increments the shutdown check flag. After 16 counts, this flag will produce a carry. The fact that a carry has occurred, will send the program into the portion of this routine which is a large loop that resets all outputs except A502-27 for relay KC3 and A502-15 for indicator LD702. The program will stay in the loop and indicator LD702 will glow continuously until the machine is manually reset by the start switch.

By interacting with the specific timing loop that generates the entry into this section of the program, the 16 count wait allows a specified time delay to be generated. Thus the condition resulting in shutdown must last for a specified period of time before the machine will actually shut down. For example the main control program is entered every four tenths of a second. If a shutdown signal comes from the main control program, the 16 times that are required for shutdown to actually occur, correspond to 6.4 seconds. During the normal temperature control cycle and under certain conditions, the oil temperature may transiently exceed the high limit temperature (435° F.). The 6.4 second delay provided by this routine avoids an undesirable shutdown due to such a temperature transient.

The 50/60 cycle Routine (FIG. 14) is a natural return point for all other program segments. As the beginning of this routine, the clock input is activated and the clock line is examined for zero and then for one. Upon detecting a zero to one transition, the 50/60 counter is incremented and the 2-second blink counter is incremented. The memory is examined to see whether 50 or 60 cycle rate is to be counted and the appropriate correction is made. The counter is arranged so that the least significant digit of the counter will count 5. This least significant digit is then examined and one of various routines is entered based upon the digit number.

The order of the routines that are entered, was carefully chosen so that those routines which might be affected by changes in the output, would be removed in time from those changes. The sequence of these operations is that when the counter reads zero, the time update routine is entered. This routine uses no inputs other than the 60 cycle detection. When the least significant digit of the counter is one, the cooking counter and input strobe routine are entered. When the count is three, the main temperature control routine is entered. And when the count is four, the output routine, which collects the decisions made by all the other routines and acts upon them is entered. This guarantees that output changes which occur at C=4, will have the least effect upon the temperature control routines, which are rather sensitive routines because of the external analog circuitry involved. With this kind of routine distribution, each segment of the program is entered every tenth of a second. This provides natural timing for such functions as the de-bounce of switches and certain other functions where it is desirable to have some short time period upon which to base a decision.

Figure 12:
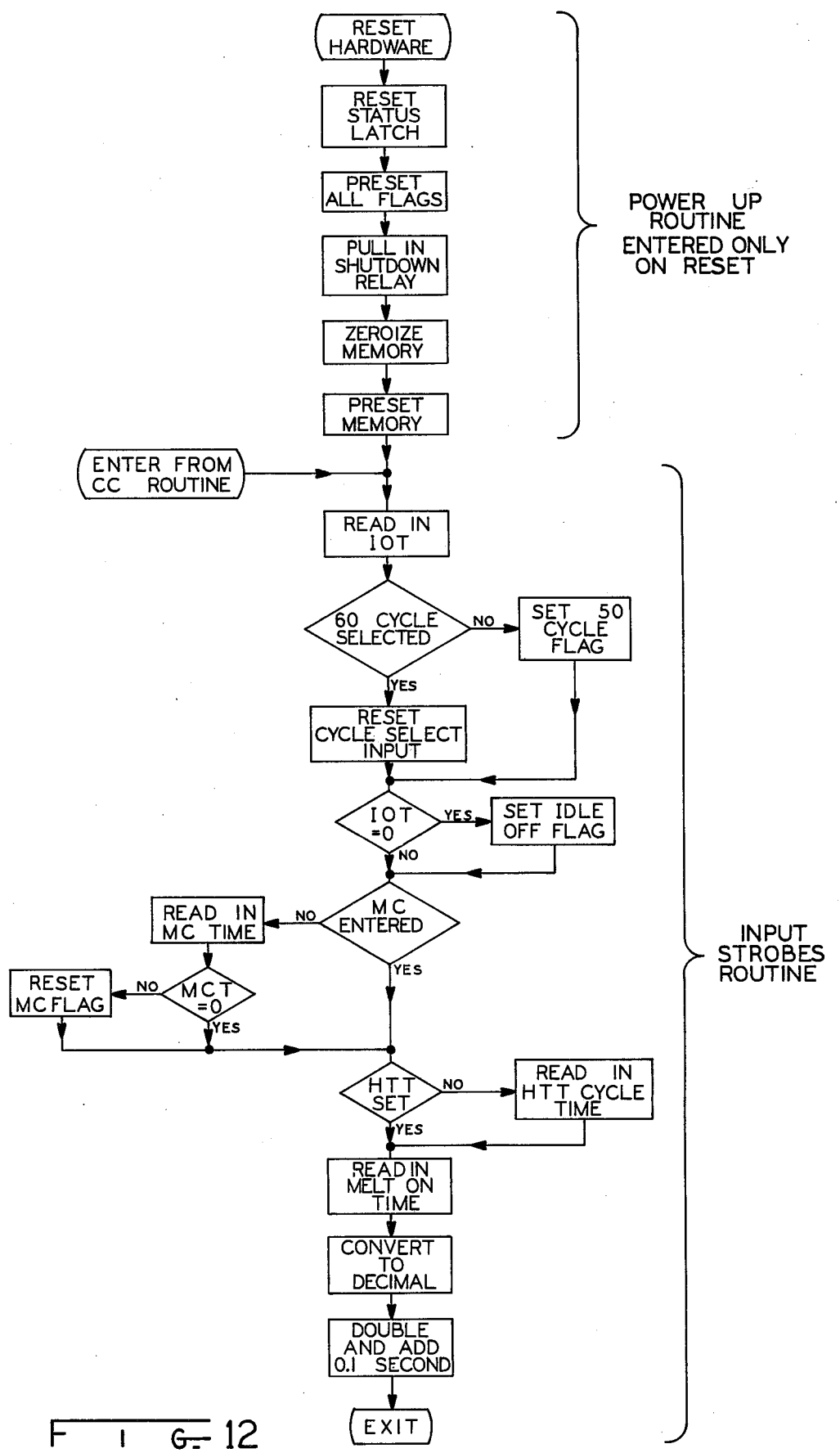
FIG. 12 is a program flow chart illustrating a power up routine and input strobe routine.

The cooking counter routine (FIG. 15) first looks for a zero to one transition of the pulse input from the cooking control (FIG. 8). It also checks to see that the period of the pulses is less than 30 seconds by resetting the 30 second counter each time a zero to one transition is detected. If no transition is detected within the 30 second period, the microcomputer assumes that the cooking control is defective and will activate an error flag. Otherwise, this routine looks at the two flags which are set by cooking counter pushbuttons S104 and S105 to see if the cooking counters are active. Each counter, if active, has its counter decremented by one for each zero to one transition detected. When the counter is decremented through zero, the cooking counter time has expired, a buzzer flag is set and the cooking computer flag is reset. After both channels of the cooking counter have been examined and updated, this routine goes to the input strobes routine which is shown in FIG. 12.

Figure 16:
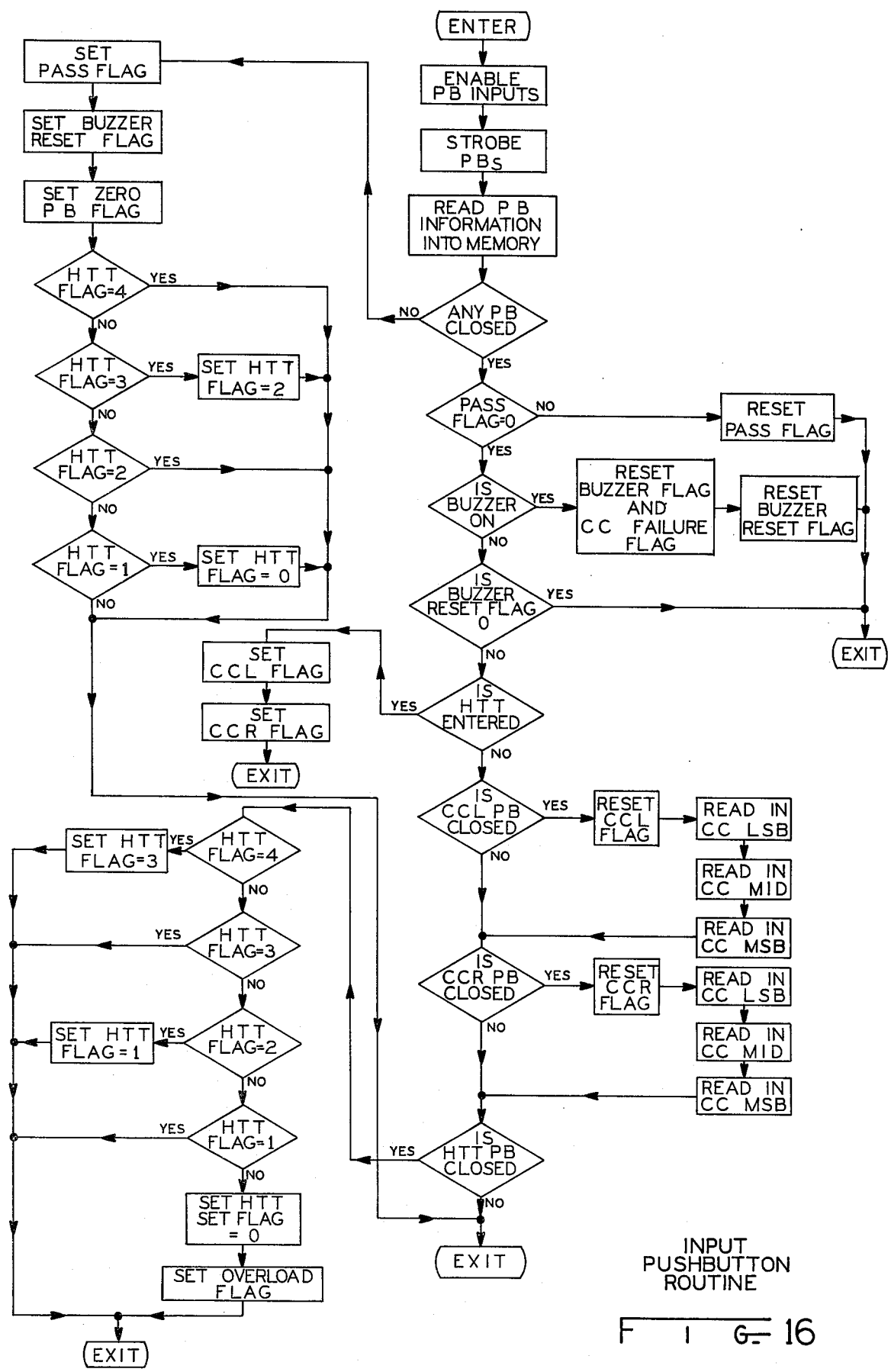
FIG. 16 is a program flow chart for a routine to input to the computer information designated by various pushbuttons.

FIG. 16 shows the Input Push Button routine which reads all of the push buttons. A pass flag is used to assure de-bounce of the switches. It must be set to get into the control portion of the routine.

The next decision is whether the buzzer is on. If the buzzer is on and either counter pushbutton is pushed, the buzzer will be turned off and a flag will be activated indicating that this pushbutton has reset the buzzer. No further action will occur and this particular section of the program will be bypassed until the button is released.

If the high temperature test is not being performed, the two cooking counter pushbuttons are examined. If either of them is detected to be closed, the appropriate cooking counter flag is reset and, the machine reads 3 digits into the 3 digits of the cooking counter that is to be counted down to zero. These digits are in the microcomputer multiplex input circuit. In the illustrated implementation in the control system, the single diode CR527 corresponding to the number 200, is read.

After the cooking counter pushbuttons are examined, the high temperature test pushbutton is examined. This button is unusual in that it must be pressed 3 times within a 5 second period. This 5 second period is not synchronized with the pushbutton so that the 3 pushes may expand into 5 pushbutton pushes if the reset occurs during a sequence of pushes. This is accomplished by resetting to 4 the high temperature test flag (HTT Flag). This flag is then decremented alternately by detecting that a pushbutton has been pressed or released. When the flag reaches zero, the high temperature test is initiated. The flag is reset to 4 with a 5 second counter. When it is detected that the previous pushbutton closure was the high temperature test button, the program continues to count pushbutton openings until the high temperature test flag decrements to zero.

The Timer Update Routine (FIG. 17) updates at a single pass, all the counters that are associated with time. The first is the 5 second counter which resets the high temperature test flag every time a carry is detected from this counter. The second is the 30 second counter that is used to detect a failure of the cooking control probe. The third is the counter that is used in the 90 second power up state. This counter allows the appliance to operate for 90 seconds with power on from a reset and to shut the appliance off if it is determined that the thermistor has not experienced a transition. The fourth is the melt cycle counter that determines the length of the melt cycle. The fifth counter which is updated determines the length of the high temperature test.

The next group of counters are those counters that control the energy save function. The delayed off reset counter measures to see whether the duty cycle of the heater is greater or less than 14.3%.

The counter is reset for each ON to OFF transition of the heaters. A one (1) is added to the counter for each minute that the heaters are off. A six (6) is substracted from the counter for each minute the heaters are on. The detection of underflow of this counter resets the counter that is used to determine the length of time for the delayed off. The underflow indicates that the heaters are being used for more than 14.3% of the time at any specific cycle during this delayed off period. If the duty cycle remains less that 14.3% for the duration of the delayed off counter countdown, the machine will shut itself off by deenergizing relay KC3.

The last counter which is affected by this routine is the melt period counter. It is incremented once each pass through this routine.

Figure 18A:
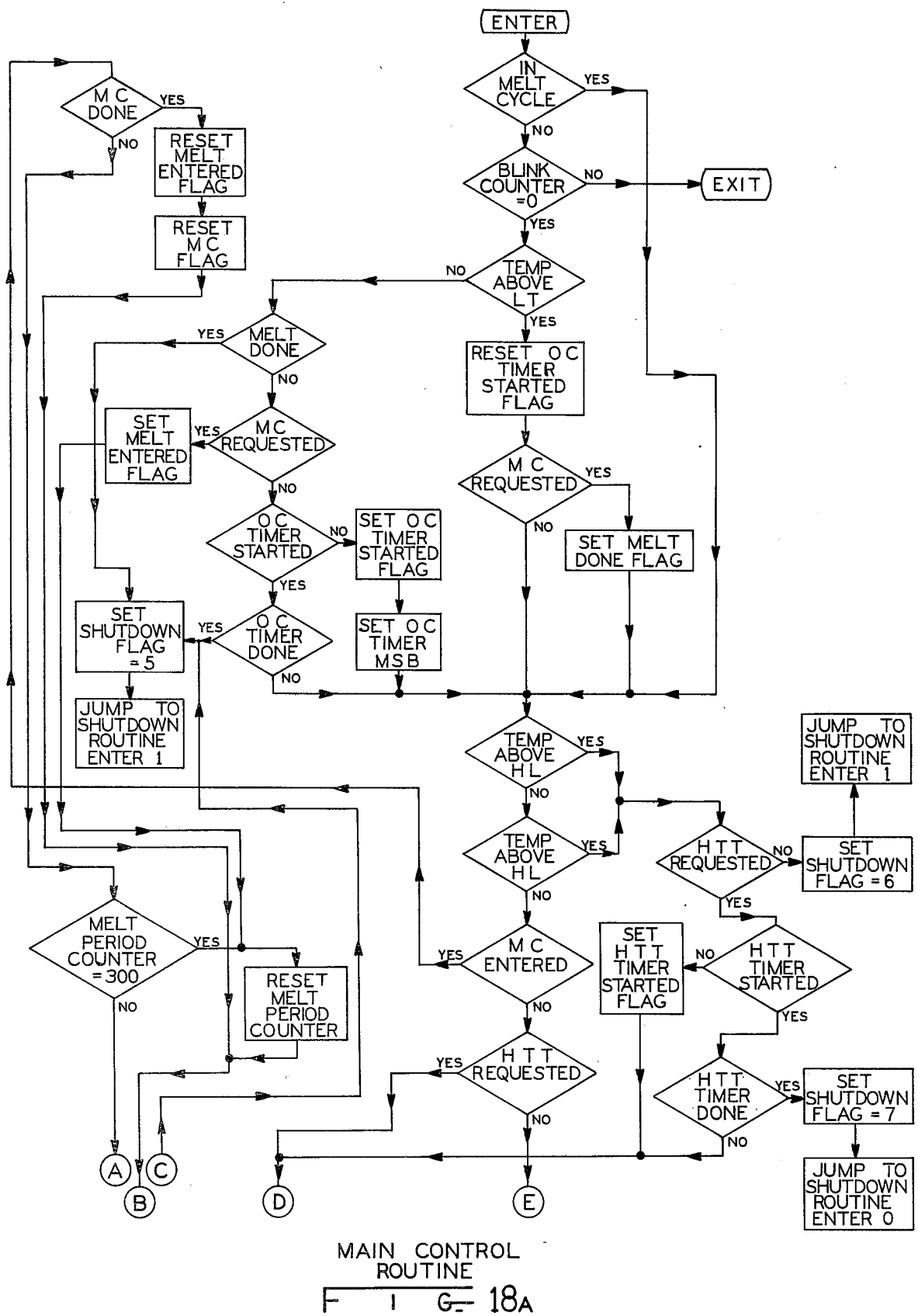
FIGS. 18A and 18B, is a program flow chart for a main control routine for the illustrative control system; the encircled letters A, B, C, D and E indicate where the chart portion of FIGS. 18A and 18B join.
Figure 18B:
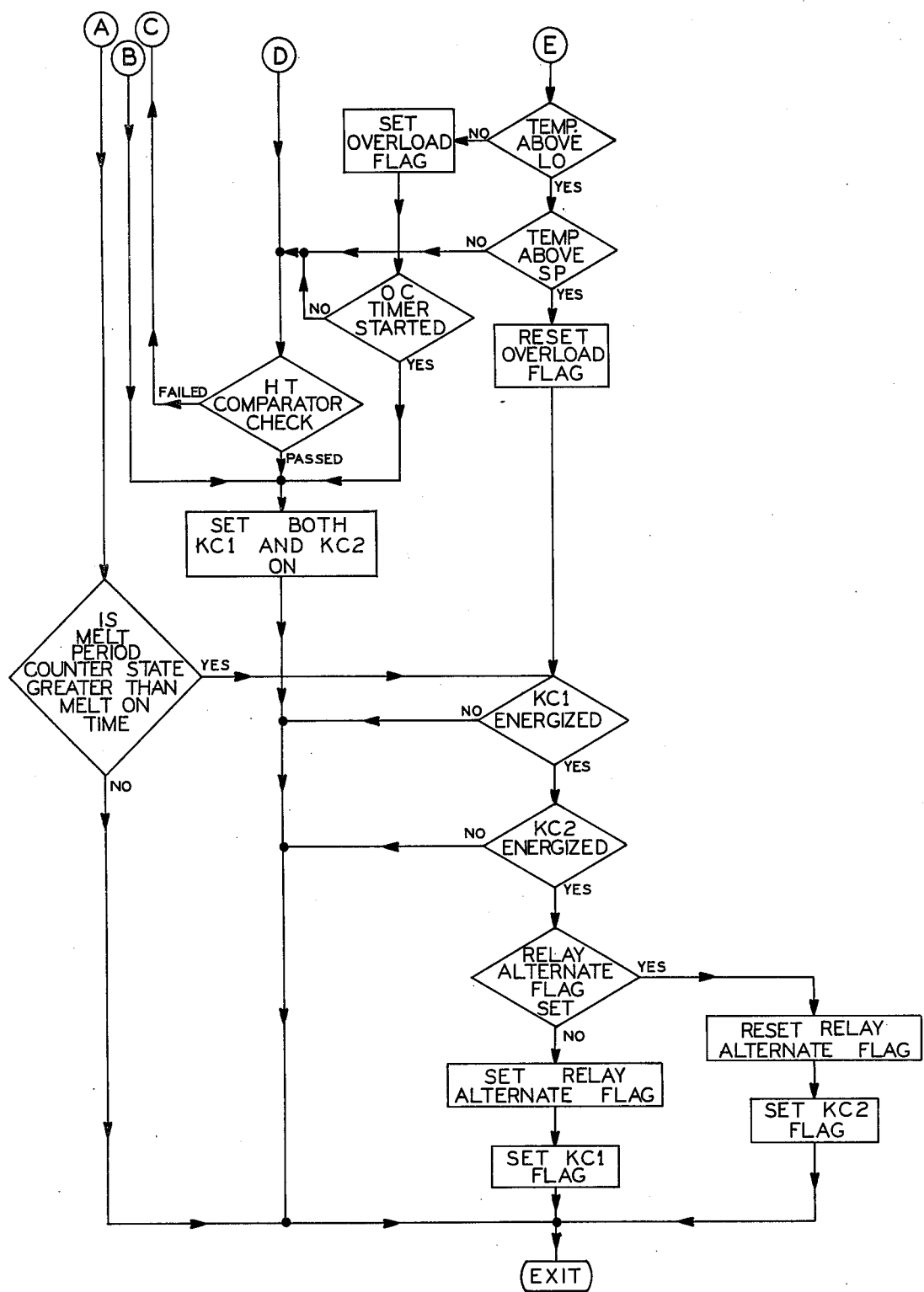

The Main Control Routine is shown in FIGS. 18A and 18B. This routine makes all of the determinations that the control the temperature of the fluid that measures the temperature of the fluid and that alternate the relays. This routine is entered each tenth of a second. If the melt cycle is entered, the routine is executed each time it is entered. If the appliance is not in the melt cycle, the blink counter is used to provide an entry into the remainder of the routine every four tenths of a second.

If the melt cycle has been entered, the path through this section of the program is as follows. The output state of the two temperature comparators A401B and A401C in the "high limit temperature" check mode are examined. Comparators A401C is examined first, then the duplicate comparator A401B.

As long as the temperature of the fluid is not greater than the high limit temperature, and the melt cycle has been entered, the program continues to provide a duty cycle of controlled heat pulses to the heating elements for the duration of the melt cycle.

The melt cycle is entered under the following conditions: the temperature is determined to be below the low limit temperature, the melt cycle has not been completed and the melt cycle is called for. Under these conditions the melt entered flag will be set and the melt cycle will commence. If the melt cycle has not been called for and the temperature is below the low limit temperature, the 90 second time will be started and the heaters will be turned on until the 90 second time period expires. If the temperature is below the low limit temperature when the 90 second time period expires, electronic shutdown will occur. If, however, at any time during this period the low limit temperature is exceeded, the 90 second timer will be shut down, the melt cycle flag (that indicates that a melt cycle is finished) will be set and the normal control mode will be entered.

In the normal control mode, the first thing that occurs, is a check of whether the high limit temperature has been exceeded. If the high limit temperature has been exceeded, the program checks to see if the high temperature test routine has been entered. If in the high temperature test, the program will look at the high temperature test timer. If that timer has not expired, the program will allow continued application of heat to the unit. The continuous heat input during the high temperature test is sufficient to raise the temperature of the fluid to the trip temperature of the mechanical thermostat HS1. Thus, before the high temperature timer expires, the mechanical thermostat normally will turn off the appliance. If, however the high temperature test timer expires, the appliance will be shut down immediately (does not wait 16 counts). If the temperature exceeds the high limit temperature, and the high temperature test routine has not been entered, the control system enter electronic shut down after 16 counts.

If, in the course of the normal control cycle, both of the high limit temperature checks indicate that the fluid temperature is less than the high limit temperature, the microcomputer checks to see if the duplicate high temperature comparator is working correctly. This check forces the duplicate comparator into the state that would indicate the fluid temperature is above the high limit temperature. If the comparator output does not switch, the microcomputer goes into electronic shutdown. If the comparator switches, the assumption is the high temperature check is being made successfully and the control system allows continued energization of the heaters.

After having checked the duplicate high limit temperature comparator and having ascertained that the high temperature test is not in progress, the program checks if the fluid temperature is above or below the overload temperature. If the fluid temperature is below the overload temperature, a flag will be set and will not be reset until the fluid temperature exceeds the set point temperature. This will cause LD102 to flash and alert the operator that the fluid in the fryer is excessively below the set point temperature.

If the fluid temperature is greater than the overload temperature, the program checks to see if the fluid temperature is above or below the set point temperature. If the fluid temperature is below the set point temperature, the microcomputer enables energization of both contactors and hence the heaters to cause the fluid temperature to increase to the set point temperature. If the fluid temperature is above the set point temperature, the microcomputer turns off one of the contactors, thereby turning off power to the heaters. In deenergizing the contactor, the microcomputer determines which contactor was deenergized last deenergizes the other contactor. This alternates the drop out of the contactors. In the event the selected contactor fails to open heat will continue to be applied and the fluid temperature will rise. When the fluid temperature exceeds the high limit temperature the control system goes to electronic shutdown and deenergizes both contactors.

Figure 19:
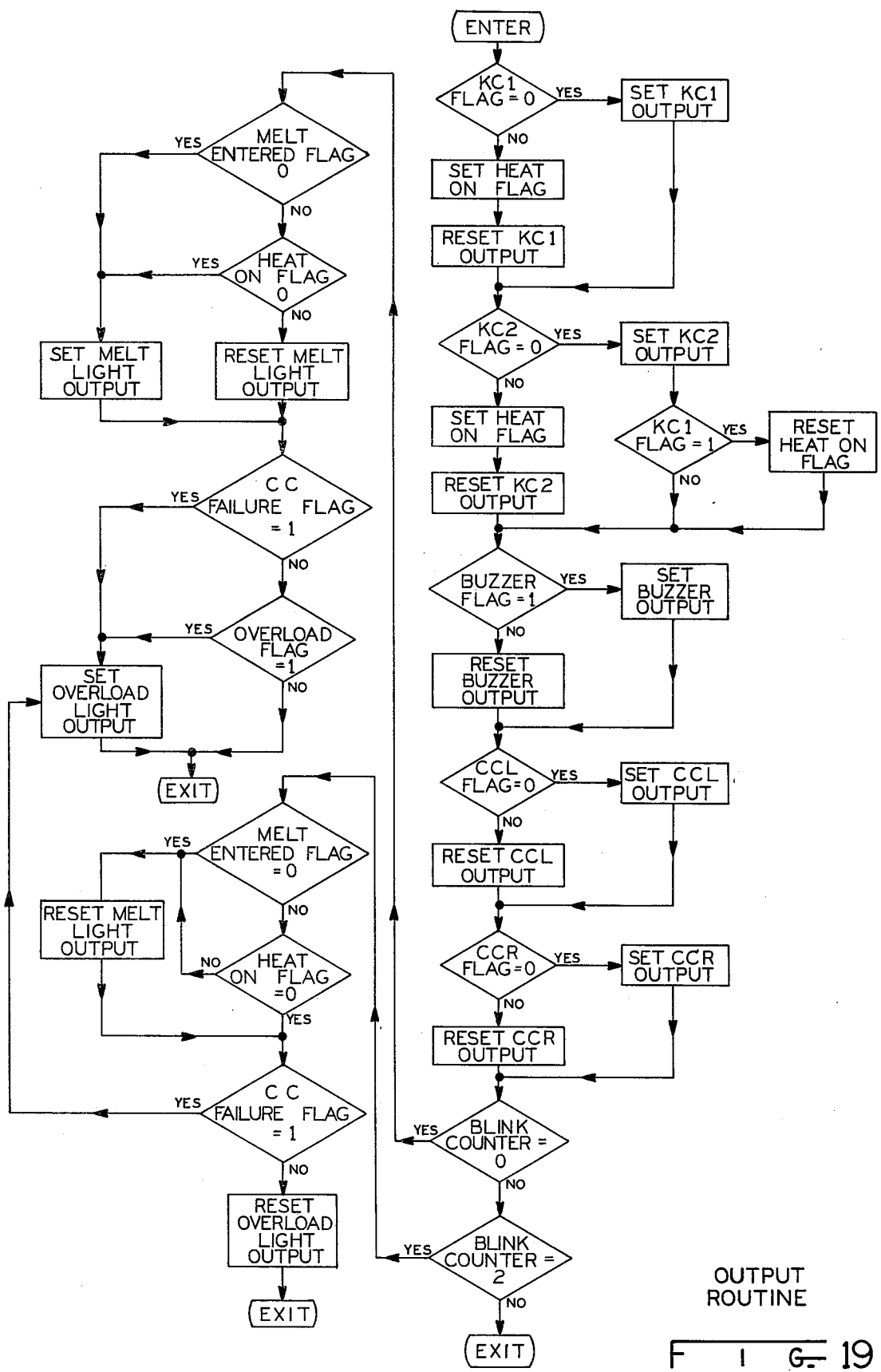
FIG. 19 is a program flow chart for an output routine.

The Output Routine is illustrated in FIG. 19. During this routine, all the flags that have been set during other routines are examined and the appropriate outputs (A502-15, 21, 22, 23, 24, 25, 26 and 27) are set or reset to provide the appropriate control of the buffer circuits.

First the two contactor output flags are examined. If the flags are zero, it will set the KC1 and KC2 ouputs. If both contactors are on, this section of the program sets the heat on flag that indicates that the heat is being applied to the unit. This flag is used in determining whether the duty cycle is exceeding about 14%. It also sets the heat on light LD701 to indicate to the operator that heat is being applied to the unit. Next, the program examines whether the buzzer flag has been set. If it has, it sets the buzzer output. If it is not set, it resets the buzzer output and turns the buzzer off. Next, the cooking counter flags are examined and the appropriate lights are set or reset depending upon whether the cooking counters are active. There are several paths that are taken depending upon the state of the blink counter. The blink counter is a counter that counts to 4 and is incremented every tenth of a second. The states that are examined for are 0 and 2. This counter is used to activate those lights that are caused to blink in the program. The blink counter provides the blink rate—the blink counter being zero causes the blinking lights to be set and the blink counter being 2 causes the blinking lights to be reset. The various decisions in blocks indicated in FIG. 19 determine which lights are to be blinked and when.

Deep fat fryers in accordance with the exemplification embodiment have been built and operated using the below listed components in the control system.

| Integrated Circuits | |
|---|---|
| Item Number | Manufacturer and Part Number |
| A301 | Fairchild UA 78M15UC |
| A401 | RCA CA 339E |
| A501 | Motorola MC 14502 BCP |
| A502 | Texas Instruments TMS1000 |
| A503 | RCA CD4052BE |
| A801 | Signetics NE555V |
| A802 | RCA CA741CE |
| A803 | RCA CA3096AE |

| Capacitors | |
|---|---|
| Item Number | Value |
| C201, C202, C502, C601 | 0.05 uf @ 500V |
| C301 | 100 uf @ 50V |
| C302, C303, C304, C901 | 1 uf @ 35V |
| C501 | .0022 uf @ 1000V |
| C503 | 47 pf @ 500V |
| C504 | 150 pf @ 500V |
| C801 | 1 uf @ 100V |

| Rectifiers | |
|---|---|
| Item Number | Manufacturer and Part Number |
| DB201, DB202 | Varo VM4B |
| CR301, CR302, CR303 | General Electric A14A |
| CR304, CR305 | Motorola IN5231A |
| All other diodes | General Electric DA1702 |

| Photocouplers | |
|---|---|
| Item Number | Manufacturer and Part Number |
| PC 201, PC 202 | General Electric H11C1 |

| Triacs | |
|---|---|
| Item Number | Manufacturer and Part Number |
| Q201, Q202, Q609 | Motorola MAC92-4 |

| Transistor | |
|---|---|
| Item Number | Manufacturer and Part Number |
| Q203, Q204, | General Electric GES5828 LF18 |
| Q501, Q502, Q902 | General Electric 2N6076 |
| Q601, Q602, Q603 | General Electric GES5818 LF18 |
| Q604, Q608, Q901, Q903 | |
| Q605, Q606, Q607 | General Electric D240K2 |
| Q801, Q802 | Fairchild 2N5086-18 |

| Resistors | |
|---|---|
| Item Number | Value |
| R201, R202, R203, R204 | 100 OHM ¼ W 5% |
| R205, R206 | 180 OHM ¼ W 5% |
| R207, R208 | 51K ¼ W 5% |
| R209, R210 | 75K ¼ W 5% |
| R211, R212 | 750K ¼ W 5% |
| R301 | 470 OHM ¼ W 5% |
| R302 | 51 OHM ½ W 5% |
| R402 | 787 OHM 1/10 W 1% |
| R403 | 10K POT |
| R404 | 549 OHM 1/10 W 1% |
| R405 | 576 OHM 1/10 W 1% |
| R406 | 402 OHM 1/10 W 1% |
| R407 | 27.4 OHM 1/10 W 1% |
| R408 | 226K 1/10 W 1% |
| R409 | 402K 1/10 W 1% |
| R410, R412 | 21K 1/10 W 1% |
| R411, R413 | 52.3K 1/10 W 1% |
| R414, R415 | 3.01K 1/10 W 1% |
| R416 | 470 OHM ¼ W 5% |
| R417, R418 | 1.24M 1/10 W 1% |
| R419, R420 | 3K ¼ W 5% |
| R421 | 150K ¼ W 5% |
| R501, R502 | 20K ¼ W 5% |
| R503, R514 | 100K ¼ W 5% |
| R504, R515 | 510K ¼ W 5% |
| R505, R507, R508, R510, R511 R512, R513, R517 | 51K ¼ W 5% |
| R506, R516 | 150K ¼ W 5% |
| R509, R518 | 10K ¼ W 5% |

-continued

| Item | Value |
|---|---|
| R601, R602, R603, R604, R605, R606, R607, R608, R609, R610, R611, R612, R613, R614, R615, R624 | 30K ¼ W 5% |
| R616 | 1K ¼ W 5% |
| R617 | 1K 1W 5% |
| R618 | 100 OHM ¼ W 5% |
| R622, R623 | 1.5K 1 W 5% |
| R802, R803, R806 | 162K 1/10 W 1% |
| R804 | 22M ¼ W 5% |
| R805 | 365K 1/10 W 1% |
| R807 | 1K POT. BOURNS 3386W-1-102 |
| R808 | 50K POT |
| R809 | 549K 1/10 W 1% |
| R810 | 39.2K 1/10 W 1% |
| R811 | 649 1/10 W 1% |
| R812 | 4020 OHM 1/10 W 1% |
| R813, R817 | 51K ¼ W 5% |
| R814 | 1K 1/10 W 1% |
| R815 | 4020 OHM 1/10 W 1% |
| R816 | 187K 1/10 W 1% |
| R818 | 50 OHM POT BOURNS 3386W-1-500 |
| R819 | 20K POT BOURNS 3386W-1-203 |
| R820 | 4420 OHM 1/10 W 1% |
| R901 | 3K ¼ W 5% |
| R902 | 3.3 M ¼ W 5% |
| R903 | 30K ¼ W 5% |

| Thermistor Probe | |
|---|---|
| Item Number | Value |
| R401A, R801A | 100K ± 5% Nominal at 25° C. Beta at 25° C. = 3966° K. ± 1.4% |
| R401B, R801B | Variable to match thermistor |

It should be apparent to those skilled in the art that, while we have described what we presently consider to be the preferred embodiments of our invention in accordance with the Patent Statutes, changes may be made in the disclosed embodiments without actually departing from the true spirit and scope of the invention.

What we claim as new and desire to secure by Letters Patent is:

1. A cooking appliance having at least one container for receiving a body of cooking fluid and food items to be cooked in the fluid, selectively energizeable heating means for heating the cooking fluid and a control system for controlling operation of said appliance; said control system including:
   means, including a thermistor adapted to be immersed in the fluid, for generating a signal representative of the temperature of the fluid;
   reference means for providing a plurality of reference signals, each of which is representative of a predetermined temperature of the fluid;
   comparator means for comparing the generated signal with respective ones of the reference signals;
   means for storing data representative of a plurality of predetermined states of said appliance, each having a predetermined status of said heating means, such data including predetermined relationships between the generated signal and individual ones of the reference signals;
   means for strobing said comparator means to effect comparisons of said generated signal sequentially with respective ones of said reference signals; and
   output means for providing a predetermined one of said states of said appliance, with a corresponding predetermined heating means status, which is a function of the comparison result and the stored data.

2. An appliance as set forth in claim 1, wherein:
   said plurality of states of said appliance includes a shutdown state, in which said heating means is deenergized;
   said reference means includes means for providing a reference signal representative of a high limit temperature of the fluid, and said output means is adapted to place said appliance into said shutdown state, when the temperature of the fluid is above the high limit temperature.

3. An appliance as set forth in claim 2 wherein:
   said control system further includes shutdown signal means, and said output means is adapted to effect energization of said shutdown signal means upon placing said appliance in its shutdown state.

4. An appliance as set forth in claim 2, wherein:
   said comparator means includes first and second comparators for independently comparing the generated signal with a high limit temperature reference signal, said first and second comparators being respectively adapted to provide an output signal having a first state when the temperature of the fluid is above the high limit temperature and a second state when the temperature of the fluid is below the high limit temperature;
   said strobing means is adapted to strobe said first and second comparators individually; and said output means is adapted to place said appliance into its shutdown state when either output signal has a first state.

5. An appliance as set forth in claim 4, wherein:
   said control system further includes means for driving said second comparator to provide an output signal having the first state regardless of the fluid temperature;
   said strobing means is adapted to strobe said second comparator when said second comparator is so driven; and
   said output means is adapted to place said appliance into its shutdown state in the event said second comparator provides a second state output signal when so driven.

6. An appliance as set forth in claim 2, wherein:
said plurality of states of said appliance includes a melt state, in which said heating means is energized at a low heat energy level;
said reference means includes means for providing a reference signal representative of a low limit temperature;
said control system further includes manually operable means for placing the cooking appliance into said melt state;
said control system also includes timing means for timimg a predetermined period of melt state operation; and
said output means includes means operative at the end of the predetermined period of melt state operation and adapted to place said appliance into a higher heat energy state of operation in response to the temperature of the fluid being above the low limit temperature and to place said appliance into said shutdown state in response to the temperature of the fluid being below the low limit temperature.

7. An appliance as set forth in claim 1, wherein:
said reference means includes means for providing a reference signal representative of a cooking fluid set point temperature suitable for cooking food; and
said control system is adapted to place said appliance into a cooking state of operation in which said heating means is energized when the fluid temperature is below the set point temperature and is deenergized when the fluid temperature is above the set point temperature.

8. An appliance as set forth in claim 7, wherein:
said plurality of states of said appliance includes a shutdown state, in which said heating means is deenergized;
said heating is electrically energizable and said control system includes first and second contactor means for connection of the electric supply on each side of said heating means; and
said control system includes means adapted to effect opening of said first and second contactor means alternately during the cooking state of operation for effectively interrupting the supply of electric energy to said heating means and adapted to effect concurrent opening of both of said contactors to disconnect said heating means from the electric supply for said shutdown state of said appliance.

9. An appliance as set forth in claim 7, wherein:
said reference means includes means for providing a reference signal representative of an overload temperature of the fluid, lower than the set point temperature, which is indicative of an excessive food load in the cooking fluid;
said control system further includes overload signal means; and
said output means includes means adapted to provide energization of said overload signal means when the temperature of the fluid is below the overload temperature.

10. An appliance as set forth in claim 7, wherein:
said plurality of states of said appliance includes an energy save state, in which said heating means is disconnected from its source of energy;
said control system includes means adapted to monitor heating means energization, said monitor means including means adapted to differentiate between energization indicative of a food cooking operation and of an idle operation; and
said control system further includes means adapted to place said appliance in said energy save state in response to a period of idle operation which exceeds a predetermined continuous time period.

11. An appliance as set forth in claim 10, wherein:
said control system includes timing means effective to prevent placing the cooking appliance into said energy save state during a predetermined period of operation of said timing means; and
said control system further includes means effective to reset said timing means whenever a period of energization of said heating means exceeds a predetermined percentage of the time of the subsequent period of non-energization of said heating means.

12. An appliance as set forth in claim 10, wherein:
said control system includes accumulator means for counting short periods of energization of said heating means, of less than a predetermined duration;
said control system further including means adapted to place said appliance in its energy save state whenever a predetermined count by said short period counting means is reached; and
said control system also includes means responsive to a period of heating means energization at least longer than the predetermined duration of the short periods of energization to reset said accumulator means.

13. An appliance as set forth in claim 1, wherein:
said plurality of states of said appliance includes a shutdown state, in which said heating means is deenergized;
said comparator means is effective repeatedly to compare the generated signal with respective ones of said reference signals; p1 said control system includes means adapted to provide a shutdown signal responsive to a respective comparison indicative of a temperature of the fluid inconsistent with the then current state of said appliance; and
said control system also includes accumulation means for counting the shutdown signals and said control system is adapted to place said appliance into its shutdown state, when a predetermined number of shutdown signals has been counted by said accumulation means.

14. An appliance as set forth in claim 1, wherein:
said control system also includes thermostat means adapted to be immersed in the cooking fluid and effective to independently deenergize said heating means in response to a predetermined temperature of the fluid above the high limit temperature;
said control system further includes manually operated selector switch means for selecting a cooking appliance test state for checking the operation of said thermostat means, in which the heating means is continuously energized for a timed period sufficient to reach the predetermined temperature of the fluid, above the high limit temperature; and
said control system is responsive only to a predetermined sequence of selector switch actuations to allow placing said appliance in its test state.

15. An appliance as set forth in claim 14, wherein:
said control means includes accumulator means adapted to count the number of selector switch actuations and said control system is responsive to a predetermined count of said accumulator means to place said appliance in its test state; and said control system further includes timing means effective to reset said accumulator means at repetitive time intervals so that said selector switch means must be actuated a predetermined number of times in a predetermined time interval for said appliance to be placed into its test state.

16. An appliance as set forth in claim 1, wherein:

said control system also includes monitor means for sensing the action of said strobing means and responsive to the absence of such strobing action to deenergize said heating means.

17. An appliance as set forth in claim 1, wherein:

said plurality of states of said appliance includes a cooking state, in which said heating means is periodically energized for maintaining a predetermined set point temperature of the fluid suitable to cook food;

said reference means includes means for providing a reference signal representative of a low limit temperature;

said control system includes manually operable means for placing said appliance into said cooking state;

said control system includes means adapted, in response to the concurrent incidence of the setting of said manually operable means for said cooking state and said reference means providing a signal indicating a temperature of the fluid below the low limit temperature, to effect continuous energization of said heating means; and said control system also includes timing means for timing such continuous energization of said heating means and effective after a predetermined timed period of such continuous energization to place said appliance in said cooking state.

18. A cooking appliance having at least one container for receiving a body of cooking fluid and food items to be cooked in the fluid, selectively energizeable heating means for heating the fluid and a control system for controlling operation of said appliance; said control system including:

means, including a thermistor adapted to be immersed in the cooking fluid, for continuously generating a signal representative of the then extant cooking fluid temperature;

reference means to provide a plurality of reference signals, each of which is representative of a corresponding one of a high limit temperature of the cooking fluid; a low limit temperature of the cooking fluid; and a set point temperature of the cooking fluid suitable for cooking food;

operator activated means for selecting one of a plurality of states of said appliance, including a melt state of operation, in which said heating means is energized at a low heat energy level, a cooking state of operation, in which said heating means is energized at a high heat energy level for cooking food immersed in the fluid and a shutdown state, in which said heating means is deenergized;

comparator means for comparing the generated signal with respective ones of the reference signals;

memory means for storing data representative of each of said plurality of states of said cooking appliance, such data including predetermined relationships between said generated signal and individual ones of said reference signals;

means for repetitively strobing said comparator means to effect comparisons of said generated signal with respective ones at said reference signals;

output means for providing a predetermined one of said states which is a function of the comparison result and the stored data; and timing means adapted, upon operator selection of said melt state to override comparison results for a predetermined time period of melt state operation;

said output means being adapted, at the conclusion of the predetermined period of melt state operation, to enable said cooking state in response to the temperature of the fluid being above the low limit temperature and to enable said shutdown state, in response to the temperature of the fluid being below the low limit temperature;

said output means also including means adapted, during said cooking state, to enable energization of said heating means in response to the temperature of the fluid being below the set point temperature and to enable deenergization of said heating means in response to the temperature of the fluid being above the set point temperature;

said output means further being adapted to enable said shutdown state in response to the temperature of the fluid being above the high limit temperature.

19. A cooking appliance as set forth in claim 18, wherein:

said control system includes means adapted to produce a shutdown signal in response to each comparison result which indicates the temperature of the fluid is below the low limit temperature and in response to each comparison result which indicates the temperature of the fluid is above the high limit temperature; and said control system also includes means for counting the number of shutdown signals and enabling said shutdown state in response to the occurrence of a predetermined number of shutdown signals.

20. A cooking appliance having at least one container for receiving a body of cooking fluid and food items to be cooked in the fluid, selectively energizeable heating means for heating the cooking fluid and a control system for timing the cooking of food immersed in the fluid; said control system including:

generation means, including a thermistor adapted to be positioned in the fluid, for generating a voltage representative of the temperature of the fluid;

a relaxation oscillator having an integrating capacitance for triggering said oscillator;

conversion means coupled with said generation means and with said integrating capacitance, said conversion means including selectively variable resistance means adapted to modify the generated voltage in response to the desired doneness of the particular food being cooked, said conversion means further being adapted to convert the modified generated voltage to a current for charging said integrating capacitance so that said oscillator provides a series of pulses which vary in frequency as the temperature of the fluid varies;

indicating means adapted to indicate the completion of cooking for food in the fluid; and cooking counter means coupled with said oscillator and with said indication means and adapted, in response to counting a predetermined number of pulses from said oscillator, to effect energization of said indication means.

21. An appliance as set forth in claim 20 wherein:
said indication means includes means effective, when energized, to produce a user perceptible signal.

22. An appliance as set forth in claim 20 wherein:
said indication means includes means effective, when energized, to remove the food from the cooking fluid.

23. An appliance as set forth in claim 20, wherein:
said conversion means includes current mirror means having a control lead and an output lead; said current mirror means is adapted to provide substantially the same current flow through said output lead as the current flow through said control lead; and p1 said selectively variable resistence means is connected between said generation means and said control lead.

24. An appliance as set forth in claim 20, wherein:
said generation means is adapted to generate a voltage which varies over a larger range than the range of corresponding variation of the temperature of the fluid; and
said conversion means includes means coupled with said generation means and adapted to expand the range of the voltage variation in relation to the range of the corresponding temperature variation of the fluid.

25. A cooking appliance having at least one container for receiving a body of cooking fluid and food items to be cooked in the fluid, selectively energizeable heating means for heating the cooking fluid and a control system for timing the cooking of food immersed in the fluid, said control system including:
generation means, including a thermistor adapted to be positioned in the fluid, for generating a voltage representative of the temperature of the fluid;
a relaxation oscillator having an integrating capacitance for triggering said oscillator;
conversion means coupled with said generation means and with said integrating capacitance and adapted to convert the generated voltage to a current for charging said integrating capacitance so that said oscillator provides a series of pulses which vary in frequency as the temperature of the fluid varies;
indication means adapted to indicate the completion of cooking for food in the fluid;
cooking counter means coupled with said oscillator and with said indication means and adapted to effect energization of said indicator means, in response to counting a predetermined number of pulses from said oscillator; and
operator actuated adjustment means coupled with said cooking counter means and adapted to selectively vary said predetermined number of pulses for providing desired degree of doneness of the particular load being cooked.

26. A cooking appliance having at least one container for receiving a body of cooking fluid and food items to be cooked in the fluid, selectively energizeable heating means for heating the cooking fluid and a control system for timing the cooking of food immersed in the fluid; said control being adapted to accommodate an additional load of food being immersed in the fluid while a prior load is being cooked and including:
generation means, including a thermistor adapted to be positioned in the fluid, for generating a voltage representative of the temperature of the fluid;
a relaxation oscillator having an integrating capacitance for triggering said oscillator;
conversion means coupled with said generating means and with said integrating capacitance, said conversion means including selectively variable resistance means adapted to modify the generated voltage in response to the desired degree of doneness of the particular food being cooked, the conversion means further being adapted to convert the modified generated voltage to a current for charging said integrating capacitance so that said oscillator provides a series of pulses which vary in frequency as the temperature of the fluid varies;
indication means adapted to indicate the completion of cooking for food in the fluid; and
cooking counter means coupled with said oscillator and with said indication means and adapted, in response to independently counting a predetermined number of pulses from said oscillator after a respective load of food has been placed in the cooking fluid, to effect energization of said indication means for that respective load of food.

27. An appliance as set forth in claim 26, wherein:
said indication means includes means for independently removing each respective load of food from the fluid upon energization of said indication means for that respective load of food.

28. An appliance as set forth in claim 26, wherein:
said indication means includes means for independently producing a user perceptible signal for each respective load of food upon energization of said indication means for that respective load of food.

29. A method of controlling the operation of a cooking appliance which includes at least one container for receiving a body of cooking fluid and food items to be cooked in the fluid, and selectively energizeable heating means for heating the cooking fluid; said method including the steps of:
providing a plurality of reference signals each of which is representative of a predetermined cooking fluid temperature;
generating a signal representative of the then existing cooking fluid temperature;
storing data, including predetermined relationships between the generated signal and individual ones of the reference signals, to define a plurality of states of the cooking appliance;
individually comparing the generated signal with the reference signals; and
enabling one of the cooking appliance states in accord with the comparison result and the stored data.

30. A method as set forth in claim 29 wherein one of the reference signals is representative of a high limit temperature; one of the plurality of states is a shutdown state, in which the heating means is deenergized, said method further includes the steps of:
enabling the shutdown state when said signal comparison indicates the temperature of the fluid is above the high limit temperature.

31. A method as set forth in claim 30, further including the step of:
providing a user perceptible signal when the cooking appliance shutdown state is enabled.

32. A method as set forth in claim 30, further including the steps of:
providing a comparator for comparing the generated signal with the high limit temperature reference signal;

driving the comparator, independent of the high limit temperature reference signal, in a manner suitable to produce a comparison indicating a fluid temperature above the high limit temperature; and enabling the shutdown state in response to the resulting output of the comparator being other than representative of fluid temperature higher than the high limit temperature.

33. A method as set forth in claim 29 wherein one of said plurality of states is a shutdown state, in which the heating means in deenergized, said method including the steps of:

providing two, independent reference signals each representative of a high limit temperature of the fluid;

independently comparing the generated signal with each of the high limit temperature signals; and enabling the shutdown state when the comparison of the generated signal with either high limit temperature signal indicates the temperature of the fluid is above the high limit temperature.

34. A method as set forth in claim 29 wherein one of the plurality of states is a melt state, in which the heating means is energized at a low heat energy level, another of the plurality of states is a shutdown state, in which the heating means is deenergized, and one of the reference signals is representative of a low limit temperature; said method further including the steps of:

selectively enabling the melt state;

timing the melt state operation of the appliance;

after a predetermined period of melt state operation; enabling a higher energy state of operation of the cooking appliance in response to the temperature of the fluid being above the low limit temperature and enabling the shutdown state in response to the temperature of the fluid being below the low limit temperature.

35. A method as set forth in claim 29 wherein one of the plurality of states is a cooking state, in which the heating means is energized at a high heat level for cooking food, and one of the reference signals is representative of a set point temperature suitable for cooking food; said method further including the steps of:

energizing the heating means when the temperature of the fluid is below the set point temperature; and deenergizing the heating means when the temperature of the fluid is above the set point temperature.

36. A method as set forth in claim 35 wherein one of the reference signals is representative of an overload temperature, indicative of an excessive food load in the cooking fluid; said method further including the step of providing an overload signal, during the cooking state, whenever the temperature of the fluid goes below the overload temperature.

37. A method as set forth in claim 35, further including the steps of:

monitoring heating means energization during cooking state operation to determine idle periods when no food is being cooked;

accumulating a count of idle period operation; and deenergizing the heating means when the count reaches a predetermined level.

38. A method as set forth in claim 29 wherein one of the plurality of states is a shutdown state in which the heating means is deenergized; said method further including the steps of:

repeatedly comparing the generated signal sequentially with respective ones of the reference signals;

providing a shutdown signal when an individual comparison indicates the cooking fluid temperature is inconsistent with the then extant cooking appliance state;

counting the shutdown signals; and enabling the appliance shutdown state in response to the occurrence at a predetermined number of signals.

* * * * *